US005666503A

United States Patent [19]
Campanelli et al.

[11] Patent Number: 5,666,503
[45] Date of Patent: Sep. 9, 1997

[54] STRUCTURED IMAGE (SI) IMAGE EDITOR AND METHOD FOR EDITING STRUCTURED IMAGES

[75] Inventors: Michael R. Campanelli, Webster; William A. Fuss; Dennis L. Venable, both of Rochester, all of N.Y.

[73] Assignee: Xerox Corporation, Stamford, Conn.

[21] Appl. No.: 338,856

[22] Filed: Nov. 14, 1994

[51] Int. Cl.[6] ........................................................ G06F 3/14
[52] U.S. Cl. .......................... 345/356; 395/776; 345/967
[58] Field of Search ..................................... 395/155, 159,
395/160, 161, 117, 128, 147, 148, 133,
356, 331, 332, 339, 967, 776, 788, 763,
779, 792, 782

[56] References Cited

U.S. PATENT DOCUMENTS

| 5,181,162 | 1/1993 | Smith et al. | 395/792 |
| 5,278,950 | 1/1994 | Takei et al. | 395/134 |
| 5,485,568 | 1/1996 | Venable et al. | 395/761 |
| 5,490,246 | 2/1996 | Brotsky et al. | 395/342 |

FOREIGN PATENT DOCUMENTS

| 0 528 631 A2 | 2/1993 | European Pat. Off. . |
| WO 94/22101 | 9/1994 | WIPO . |

OTHER PUBLICATIONS

Howard, "A Shareable Centralised Database for KRT[3]: A Hierarchical Graphics System Based on PHIGS," *Computers & Graphics*, vol. 12, No. 2, 1988, pp. 201–211.

Rost et al., "PEX: A Network-Transparent 3D Graphics System," *IEEE Computer Graphics and Applications*, vol. 9, No. 4, Jul. 1989, pp. 14–26.

*Primary Examiner*—Raymond J. Bayerl
*Assistant Examiner*—Crescelle N. dela Torre
*Attorney, Agent, or Firm*—Oliff & Berridge

[57] ABSTRACT

An editing process and device for modifying images in the structured image (SI) format. The image editor can perform image processing operations, transparency and geometric transform to objects. The underlying SI format allows the image editor to be memory efficient with unlimited undo capability.

39 Claims, 12 Drawing Sheets

STRUCTURED IMAGE (SI) IMAGE EDITOR AND METHOD FOR EDITING STRUCTURED IMAGES

CROSS REFERENCE TO RELATED APPLICATION

This application is related to U.S. patent application Ser. No. 08/133,422, entitled "Structured Image (SI) Format For Describing Complex Color Raster Images", filed Oct. 8, 1993, owned by the assignee of the present invention, the disclosure of which is incorporated by reference herein.

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

1. Field of the Invention

This invention relates to image editors, and more particularly to methods for editing images and image editors capable of modifying images in a structured image (SI) format using an appropriate user interface. The SI image editor and editing method provide a memory efficient open editing environment with unlimited access to past edit operations.

2. Description of Related Developments

In general, there are several types of editors designed to handle the different types of document components. Examples include, a raster editor for editing digital images, a graphics editor for editing vector graphics and a text editor for editing text information. Therefore, in order to create or edit a complex document containing text, graphics and digital/raster images, the operator currently has to edit the discrete components independently (i.e., in their native formats) and then combine them. Edit tools available today are aimed at this assembly process and are commonly called illustrators.

Illustrators are created as monolithic tools with the goal of facilitating the assembly process for subcomponent objects. In general, illustrators allow for simple editing, for example, line drawing and colorization, digital image placement and sizing, text generation, text sizing and text colorization, background colors and patterns. Given this level of editability, it still remains that, for detailed editing of subcomponent objects, the native object editor is required. For example, if the object is a completely formatted raster, then a native raster editor is required for editing.

Additionally, in cases where the lowest common denominator is bits (i.e., the digital or raster editor), all editing that includes higher level types, for example, text, must add this data as bits. When the editing is complete, the resulting image or page stands as a new representation with limited ability for undoing operations. In general, most bit editors allow only one level of undo.

Further, a critical problem with medium to low level digital or raster editors is their usage of memory. Because the image is composed of bits, edits made to the image must necessarily change bits. A common method for providing undo operations is to buffer enough memory to hold two copies of the original image. The initial image is placed in buffer 1. A first edit is merged with buffer 1 and placed in buffer 2. This process continues indefinitely, toggling between buffers, until the edit is complete. If the operation is undo, for example, the user simply renders the previous buffer. This inevitably results in the use of large amounts of memory. For example, an original 24 bit full page 300 spi image consumes 28 megabytes. Therefore, in order to edit this image, a minimum of 56 megabytes of spare disk memory is required. In addition, processing is very slow as each applied edit writes the full resolution image to disk, memory or swap.

From an historical perspective, information to be displayed or printed has ultimately been converted to digital information, i.e., ones and zeros. To facilitate the manipulation of these bits, higher orders of representation were developed (e.g., text and vector graphics). For example, to display a text string, the user types on a keyboard "display my text" and the text appears on the display screen. The processing for this information carried around data as a text representation and was rendered to bits at some destination. The operation of reediting the string utilizes the editor's internal structure to tie the placement of bits on a display screen back to a higher level text representation. This generic information flow is shown in FIG. 1.

In FIG. 1, the editor's data structure is intimately tied to the higher level representation (e.g. text or graphics). This facilitates a discrete editor's ability to perform complex editing functions. For this example, the information flow starts at input from a keyboard as the high level representation. This representation feeds the character renderer to generate bits for the display. Once rendered, the display data can be edited when selected by a mouse or cursor keys at the user interface. In the final analysis, the edit/display process evolves through a higher level representation (text, vector graphics), to bits, to higher level representation, to bits, and so forth.

Thus, the problem is that most images or pages created today are composed from multiple types of data, that is, text, graphics, patterns and all combinations thereof. Another drawback is that several assembly and editing iterations can be required before the job is finally complete. This context switching hinders creativity and slows productivity. In addition, when various data types are assembled as bits, the ability to reedit the high level data types is gone.

Accordingly, a need exists for a structured image editor that conveys the underlying components and operations that are performed to produce a complex structured image to the user, and that permits the user to easily construct, edit, re-edit and print the complex structured image.

SUMMARY OF THE INVENTION

It is thus an object of the invention to obviate the foregoing drawbacks by providing an improved editor for modifying images having a structured image (SI) format. The SI image editor can perform image processing operations, transparency and geometric transforms to SI objects. The underlying SI format allows it to be memory efficient with unlimited undo capability.

Memory efficiency is achieved by operating on display resolution data only. Unlimited undo results from textually described operations. Operations consist of a list that can be carried through the whole editing session. An operation can be deleted from the list at anytime and in any order and the display data reprocessed through the remaining list.

The object and advantages discussed above are obtained by providing a new paradigm for image editing. The SI image editor imposes a unifying layer capable of representing all other sub components, i.e., text, graphics, patterns, raster, and all combinations thereof. The software language associated with this representation is called Structured Image Definition Language (SIDL), although any other appropriately capable software language would also be acceptable for use herein. SIDL describes the creation of a complex color raster image as a collection of objects and sub-objects in a hierarchical dependent and device independent format. In this context, an image or page may be composed of text, graphics, raster, patterns, and/or other SIs. Any object capable of being displayed can be represented in SI without losing its heritage, i.e., as text, graphics, raster, patterns, or another SI. The notation for an image represented by this language is called a Structured Image Definition (SIP).

According to a first aspect of the present invention, there is provided a structured image (SI) editor for editing a structured image that includes multiple data types, including individual objects, and a pasteboard that represents a frame onto which the multiple data types are rendered. The editor includes an SI structure editor operable to create a hierarchical representation of the structured image and an SI image editor, coupleable to the SI structure editor, and being operable to edit the multiple data types while associating the multiple data types with their high level representations.

The SI structure editor and the SI image editor are combineable to form a communications link to perform monitoring and/or editing the development of a structured image definition.

The SI image editor can operate independently from the SI structure editor, or for added synergy, in combination with the SI structure editor.

The structured image has a resolution that is dependent on a resolution of a connected output device. The output device includes one of a monitor, a printer, a pen-plotter, and a display device, for example. The resolution comprises display resolution imagery with display size memory requirements. Storage of an edited structured image requires less memory than that of an original raster image. Multiple versions of edited structured images require a memory that is a fraction of a memory size required for original raster images. Multiple versions of the edited structured images are represented as descriptive text in an ASCII file.

A communications link allows editing of a structured image on a first machine while other machines, connected to the first machine, monitor the editing executed on the first machine. The other machines are operable to edit each version of the edited structured image. The editor also includes a device for editing multiple data types after they have been rendered, and for toggling between the SI image editor and the SI structure editor to edit the multiple data types.

According to a second aspect of the invention, there is provided a method for editing a structured image (SI) that includes multiple data types, including individual objects, and a pasteboard that represents a frame onto which the multiple data types are rendered. The method includes the steps of defining and editing image processing operations required to create a hierarchical representation of the structured image, and editing the multiple data types using at least one of an SI image editor and an Si structure editor while associating the multiple data types with their high level representations. Optionally, the method also can include editing a structured image on a first machine, monitoring the editing on at least one other machine using a communications link, and editing the structured image using the other machines.

Other objects, advantages, and salient features of the invention will become apparent from the detailed description which, taken in conjunction with the annexed drawings, discloses preferred embodiments of the invention.

BRIEF DESCRIPTION OF THE DRAWINGS

Referring now to the drawings which form part of this original disclosure.

DETAILED DESCRIPTION OF PREFERRED EMBODIMENTS

A. System Overview

A structured image (SI) is a hierarchical description of a composite raster image composed of component images (i.e., child objects) and the image processing operations (IPOs) necessary to render the output raster image. Any data type that can be rendered as a raster is a potential component of an SI. An SI enables the creation and manipulation of complex images easily and quickly for inclusion into printed documents.

Figure 2:
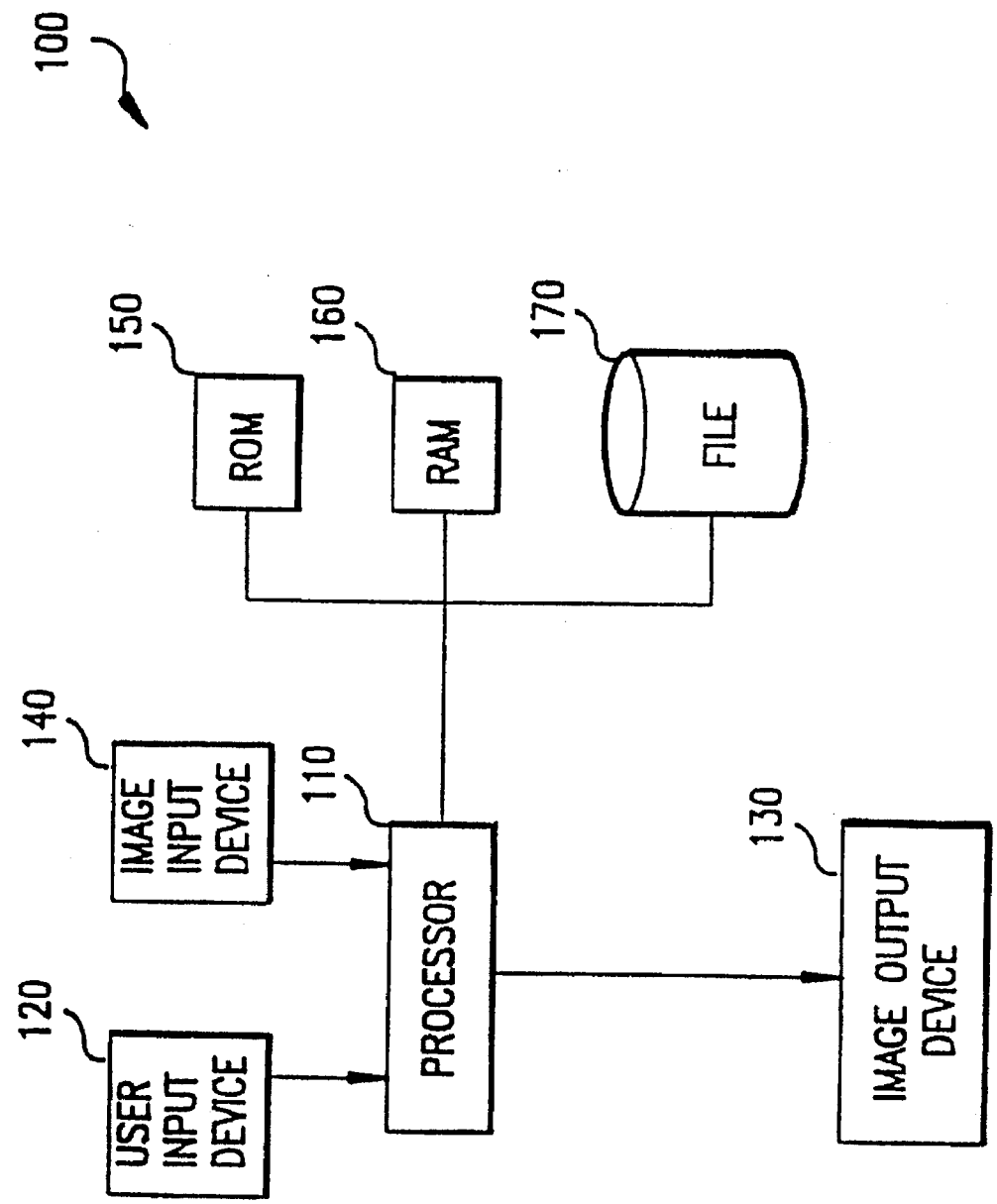
FIG. 2 is a block diagram showing general components that can be used with the invention.

An SI can be implemented (see FIG. 2) on a conventional hardware system 100 (although other embedded and networked arrangements are equally preferred), which includes a microprocessor 110 for receiving signals from, and outputting signals to various other components of system 100 according to one or more software programs run on microprocessor 110. A user input device 120 such as, for example, a mouse, a keyboard, a touchscreen and/or combinations thereof is provided for permitting a user to interface with an SI by supplying control signals thereto. An image output device 130, such as, for example, a video display monitor or a printer can be provided for outputting SI data. An SI input device 140, such as, for example, a scanner can be provided for scanning images which are then stored in memory as image sources. Image sources can also be supplied from disks.

The microprocessor 110 includes a read only memory (ROM) 150 for storing operating programs and image data, used by SI to construct and edit images. A random access memory (RAM) 160 is provided for running the various operating programs and additional files 170 can be provided for RAM overflow.

A1. Structured Image Defined

An SI is defined by an "object," which is a representation of data that can be rendered into a raster image, and a "pasteboard" that represents a "frame" for the object to be rendered onto. An SI does not have absolute size specified within the SI description. The size of each subject is stored within the pasteboard as a size relative to the sub-object's parent.

To convert an SI object into a raster image, a rendering procedure is invoked through appropriate command instructions using the user input device 120, with the object, pasteboard, and absolute dimensions of the parent object as parameters. The SI object and any child objects will be rendered to the proper output size automatically. An SI is described by a structured image definition (SID) file.

It should also be understood that an SI object may be automatically scanned into the SID using appropriate SI scanning software. Thus, interactive editing is not the only method of creating or preparing a SID for printing.

A2. Structured Image Object

Figure 3:
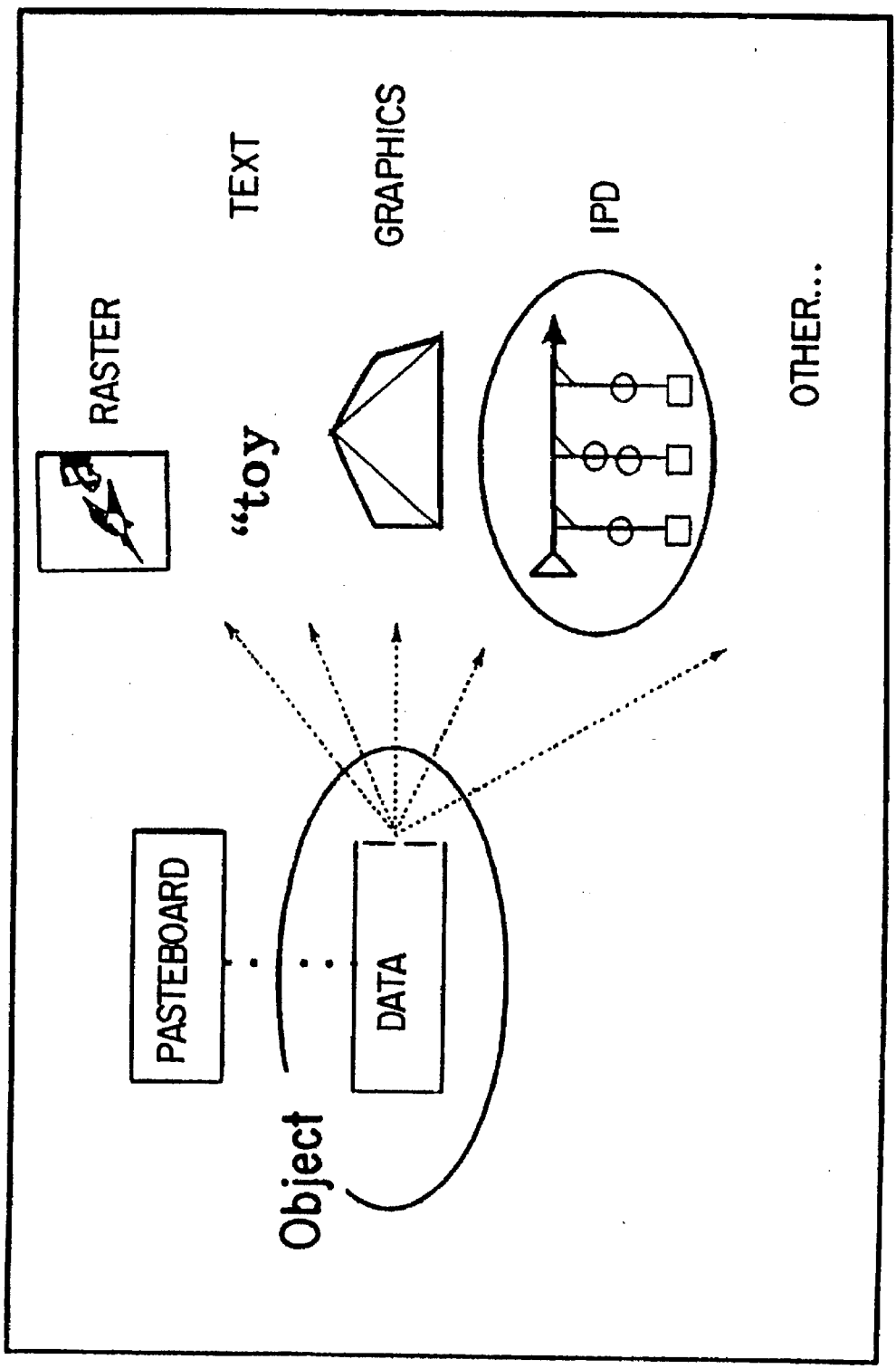
FIG. 3 is a graphic representation showing the variety of data types that make up an SI object.

An SI object is a representation of data (see FIG. 3) that can be rendered into a raster image. This data may represent simple raster images, such as TIFF files, or more complicated data such as a hierarchical collection of sub-objects and associated raster processing operations. Possible object data types include:

1) raster image—TIFF, RES, or other digital display,
2) toy text—simple text annotation,
3) CGM graphics—simple graphical annotation;
4) IPD—SI image processing description,
5) MR file—file containing a description of multiple image representations.

An important feature of SI technology is the ability to store image processing operations (IPOs) within the SID. The object data type IPD provides the mechanism for storing IPOs.

Figure 4:
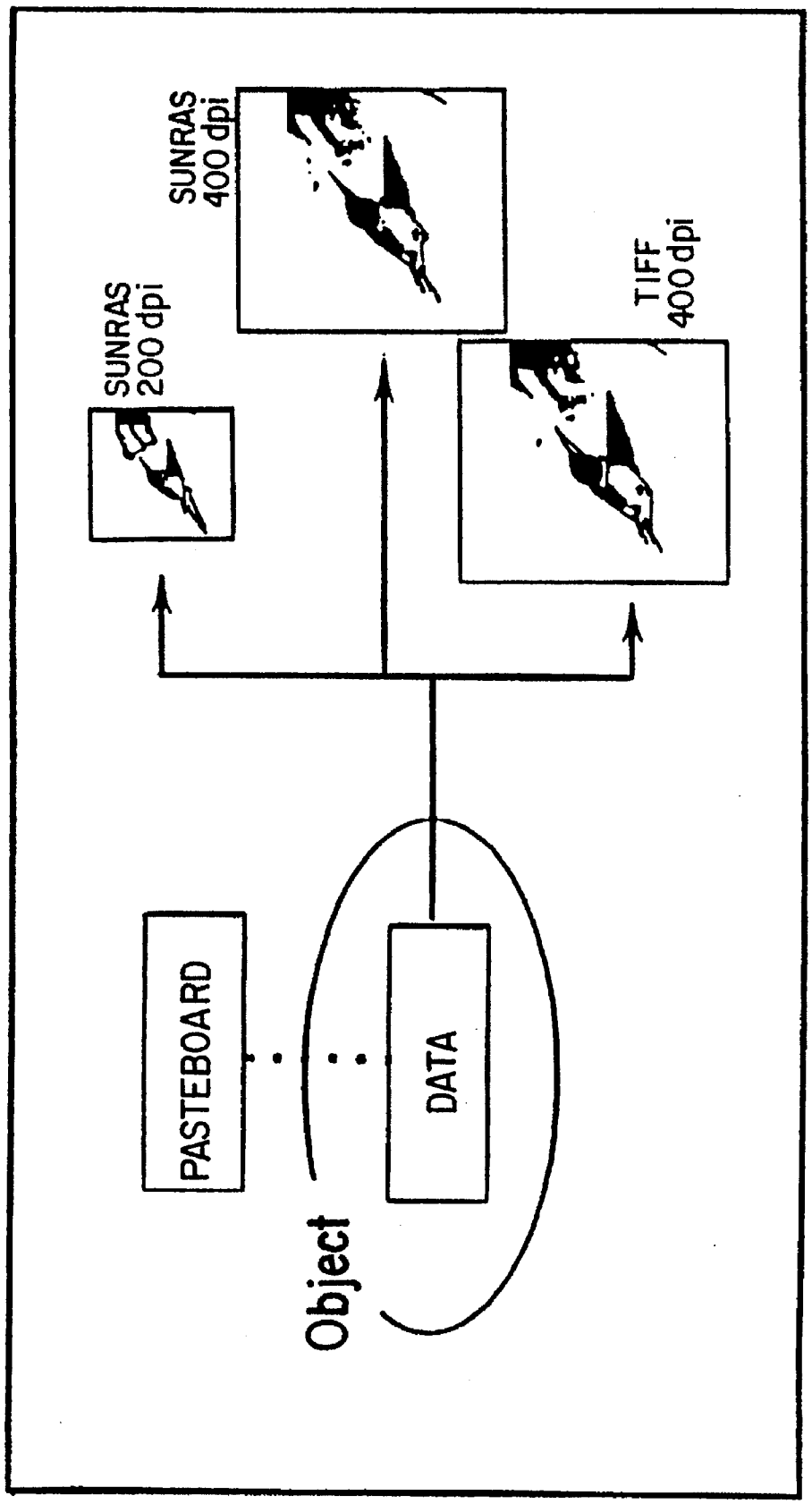
FIG. 4 is a graphic representation showing an example of the multiple representations (MR) that make up an SI object.

A single SI object may represent more than one data type and/or data file. For example (see FIG. 4), a single SI object may represent a directory containing several files stored at different resolutions. Each file represents the same image, but has different absolute pixel dimensions and photometry. This concept is known as multiple representations (MR). SI specifies multiple representations to be determined dynamically, but the MR file format is defined for those applications that require explicit specifications of multiple representations. Finally, the topmost object in an SI, i.e, the object that has no parent, is called the root object.

A3. Image Processing Definition

Figure 5:
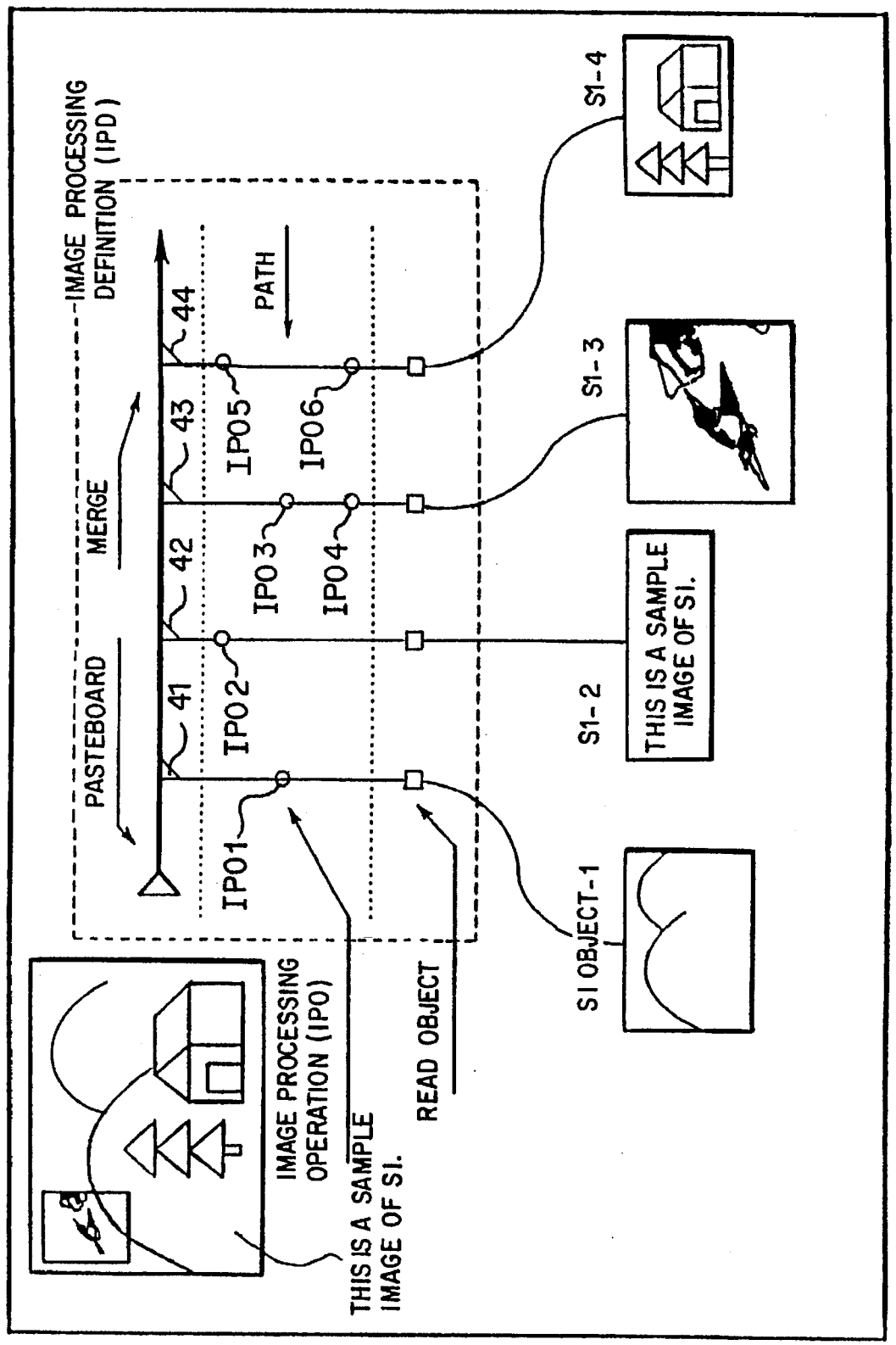
FIG. 5 is a graphic representation of an image processing definition (IPD) as it relates to the output SI, which represents a structured description of references to component objects and image processing operations (IPOs) applied to those component objects.

As discussed above, IPD is an SI object type that enables an SI to be composed of other SI objects and IPOs. For example, IP01 represents a scale operation, IP02 represents a colorize operation, and IP03–IP06 represent various operations that may include, for example, geometric transformations, filtering, enhancement, colorizating and masking. IPD represents a structured description of references to component objects and IPOs applied to those component objects. FIG. 5 is a graphical representation of an IPD.

Figure 6:
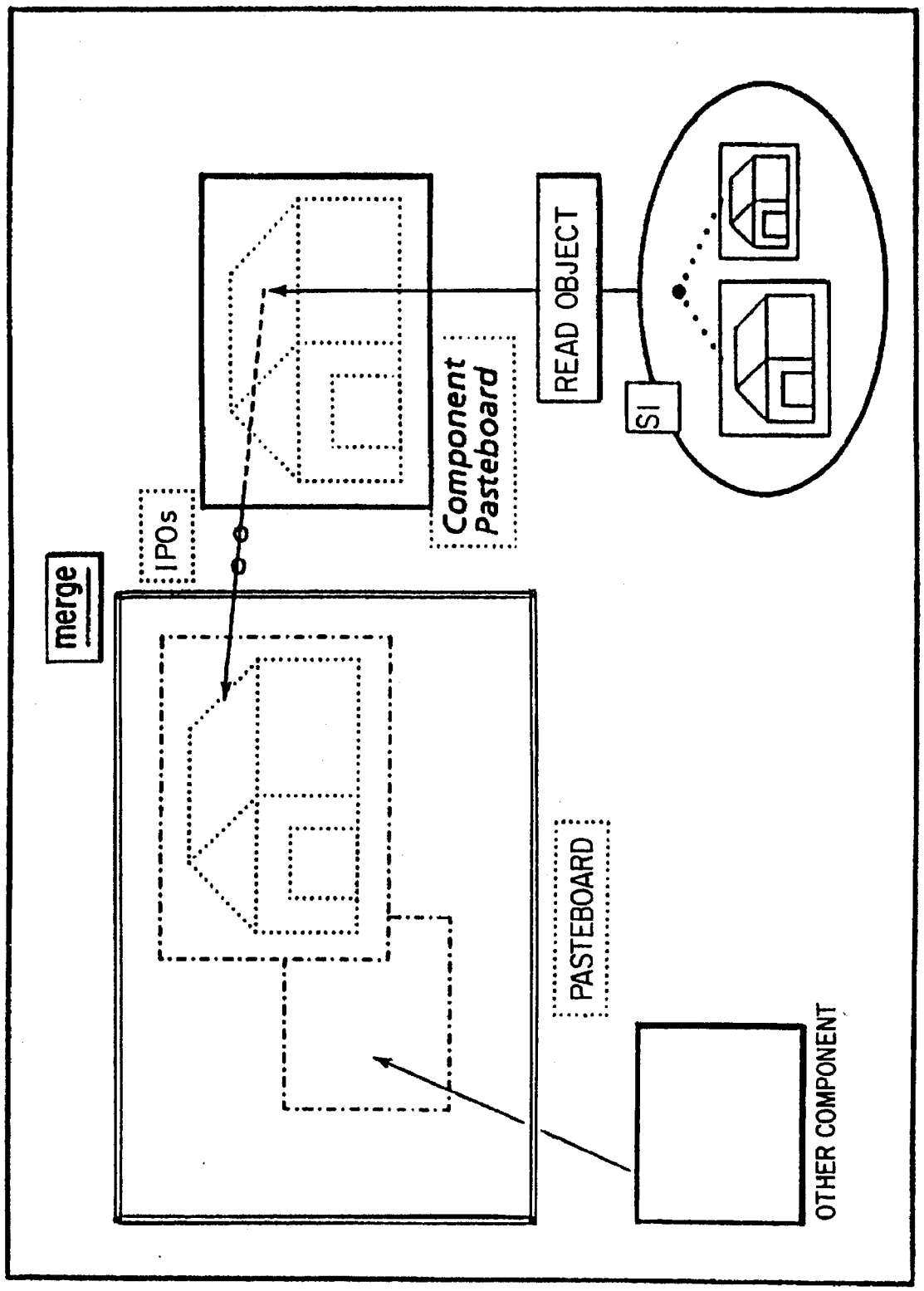
FIG. 6 depicts the flow of raster data during the rendering of an SI.

An IPD consists of references to the following descriptors: 1) default size; 2) ReadObject; 3) path; 4) IPO; 5) merge; 6) pasteboard; 7) initializer; and 8) component pasteboard. In FIG. 5, each vertical line, called a path, is a collection of IPOs. ReadObject represents a procedure that converts an SI object into a raster image suitable for processing by the IPO in the path. This can be accomplished in any well known manner. All storage formats usually have some sort of identifying tag that defines their type. The initializer simply has a list of all supported formats and identifies each format by tag type. The rendered object flows through the path and is processed by each IPO sequentially. Each path has stored within it a pasteboard used by ReadObject to define a "frame" into which the SI object is rendered. This pasteboard is referred to as the component pasteboard. The horizontal line is the IPD object pasteboard and represents a "blank" raster image onto which component pasteboards will be merged. The black triangles 41–44 represent merge operations where component pasteboards are combined into the object's pasteboard. The merge order of component pasteboards is implicit, thus a sense of "top" and "bottom" images is supported. FIG. 6 depicts the flow of raster data during the rendering of an SI (i.e., the control flow from ReadObject to Merge).

Each IPD must include information that specifies the default size for the IPD. This information is used as a hint for the rendering programs as to the size the image was intended to be rendered to. In the current SIDL syntax, this information is preferably stored as an aspect ratio and a default width string.

IPOs are device independent descriptions of image processing commands. Certain fundamental functions (IPOs), described below, are preferred:

1) Transformer: spatially transforms the size or shape of an image (e.g., affine, warp);
2) Formatter: converts pixels from one format to another (e.g., convert, interleave, cspace);
3) Filter: applies various filtering operations (e.g., convolve, median, morphological);
4) Colorizer: adjusts color value of images (e.g., relative, absolute, contrast, white-point);
5) Mask: apply mask operations (e.g., add, extract, convert, apply); and
6) Misc: apply other miscellaneous operations.

An IPO can specify the selection region of its operation. A selection is a description of which pixels in an image are to be processed in a specific operation. For example, a selection may include bitmaps or mathematical descriptions of regions. The user can also scale value between original pixel and desired pixel to control how much processing is applied (i.e., can specify gray value).

Figure 7:
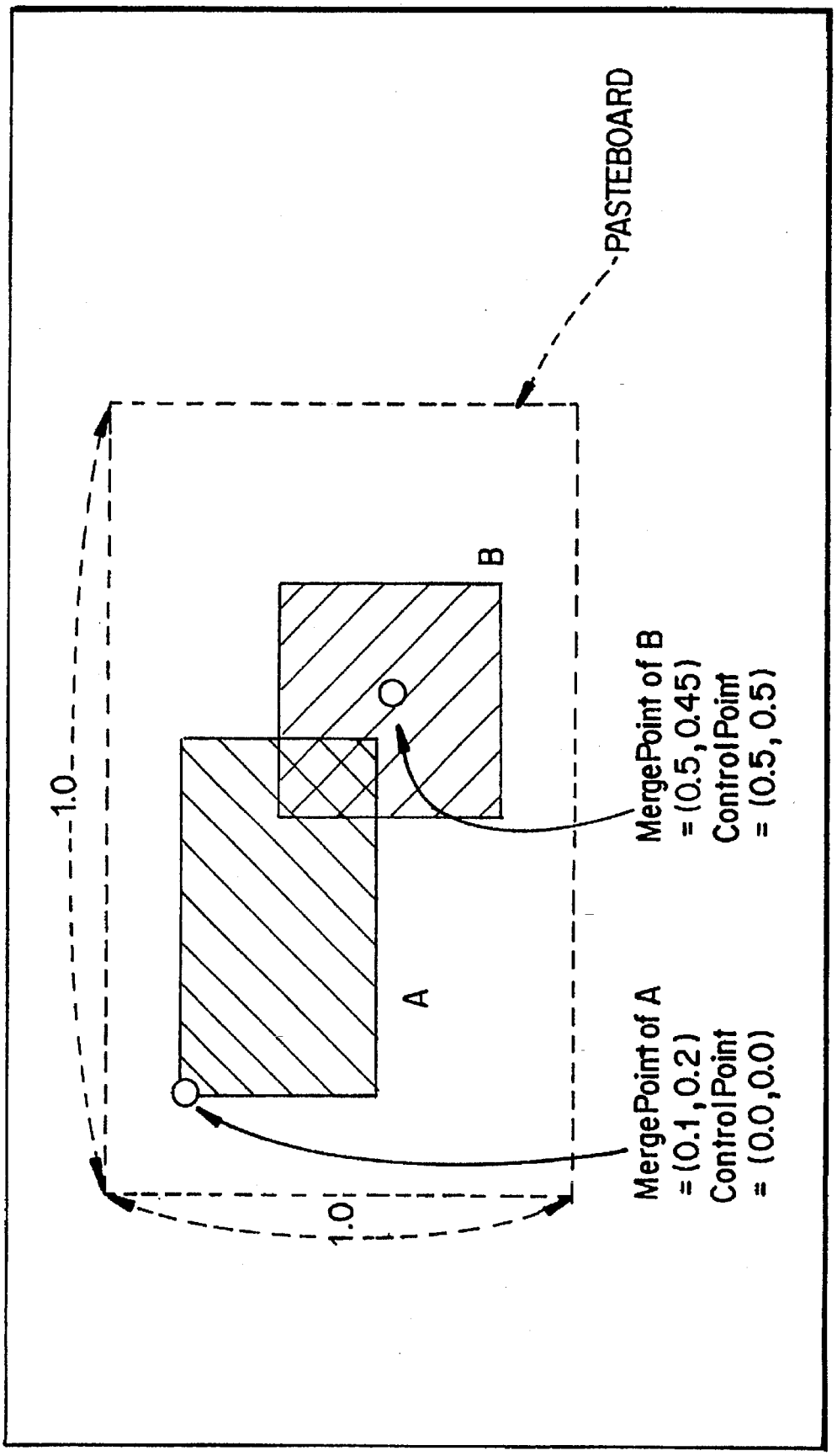
FIG. 7 is a graphic representation showing how all child objects are merged into the parent pasteboard at the location specified by the MergePoint (relative to the object pasteboard) and the ControlPoint (relative to the child pasteboard)

As shown in FIG. 7, all child objects in an IPD are merged into the parent pasteboard at the location specified by the MergePoint (relative to the object pasteboard) and the ControlPoint (relative to the child pasteboard). Merge order is explicit in the IPD.

Figure 8:
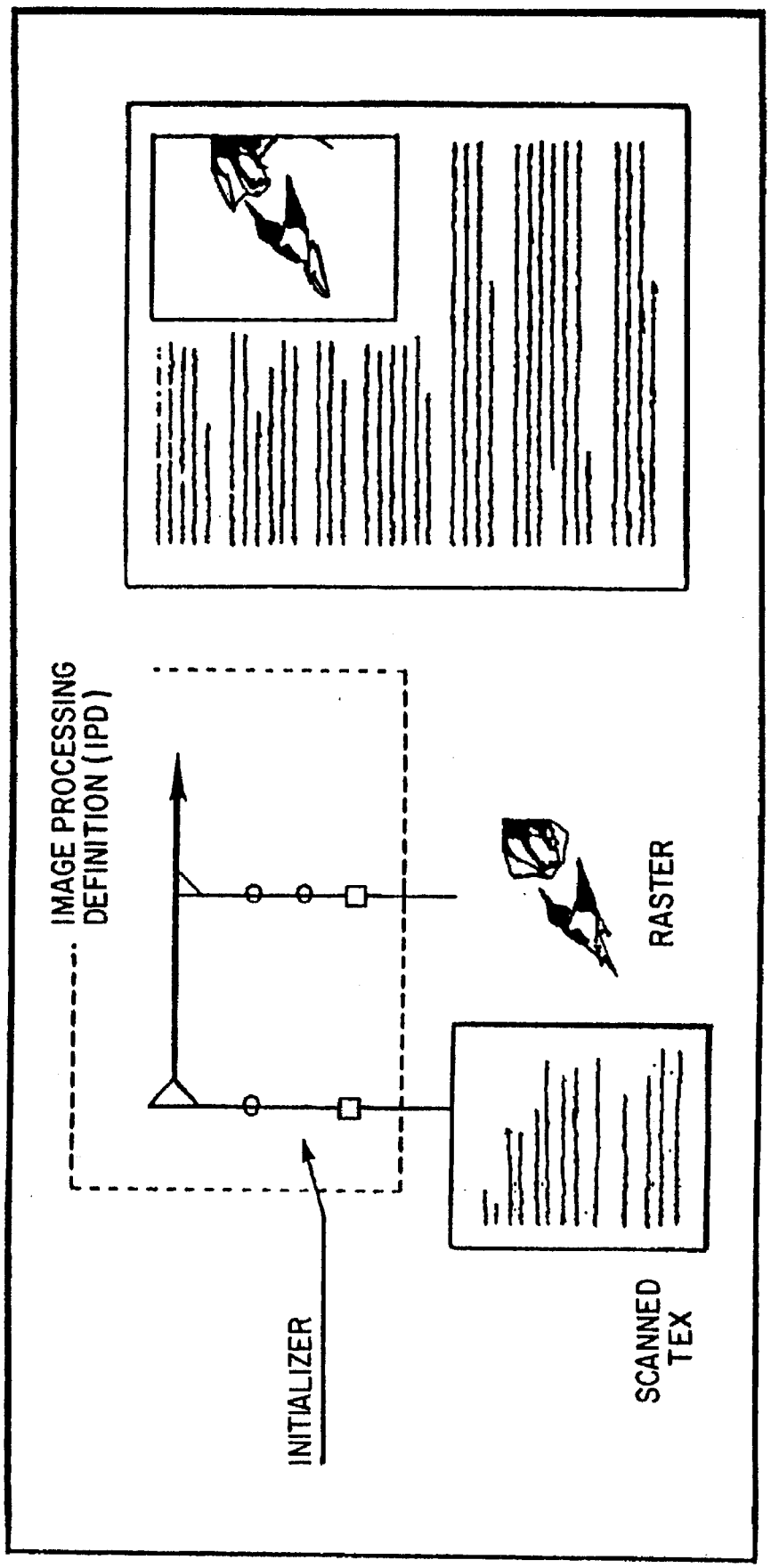
FIG. 8 is a graphic representation showing the pasteboard initializer function, in this case, initializing a pasteboard with a scanned text image.

Normally, the pasteboard of an IPD object represents a "blank" raster onto which component pasteboards merge. It is possible to initialize a pasteboard with a color, pattern, or even a raster image using the initializer (see FIG. 8). An Initializer is actually a path that contains a ReadObject and IPOs. The restriction is that the relative size be (1.0,1.0) and that no spatial transformation IPOs exist in the path. The pasteboard will be the size of the rendered initializer. Typically, the initializer is used to colorize the pasteboard or to initialize the pasteboard with a background raster image. For further details of SI technology, see related U.S. patent application Ser. No. 08/133,422, owned by the assignee of the present invention, the disclosure of which is incorporated by reference herein.

B. Structured Image (SI) Image Editor

As discussed above, the invention provides a new paradigm for image editing in the SI format. The SI image editor imposes a unifying layer in that the SI Objects are capable of representing all other subcomponents, i.e., text, graphics, patterns and raster. Any object capable of being displayed in raster can be represented in SI without losing its heritage, i.e., as text, graphics, raster, patterns, or other SI.

Figure 9:
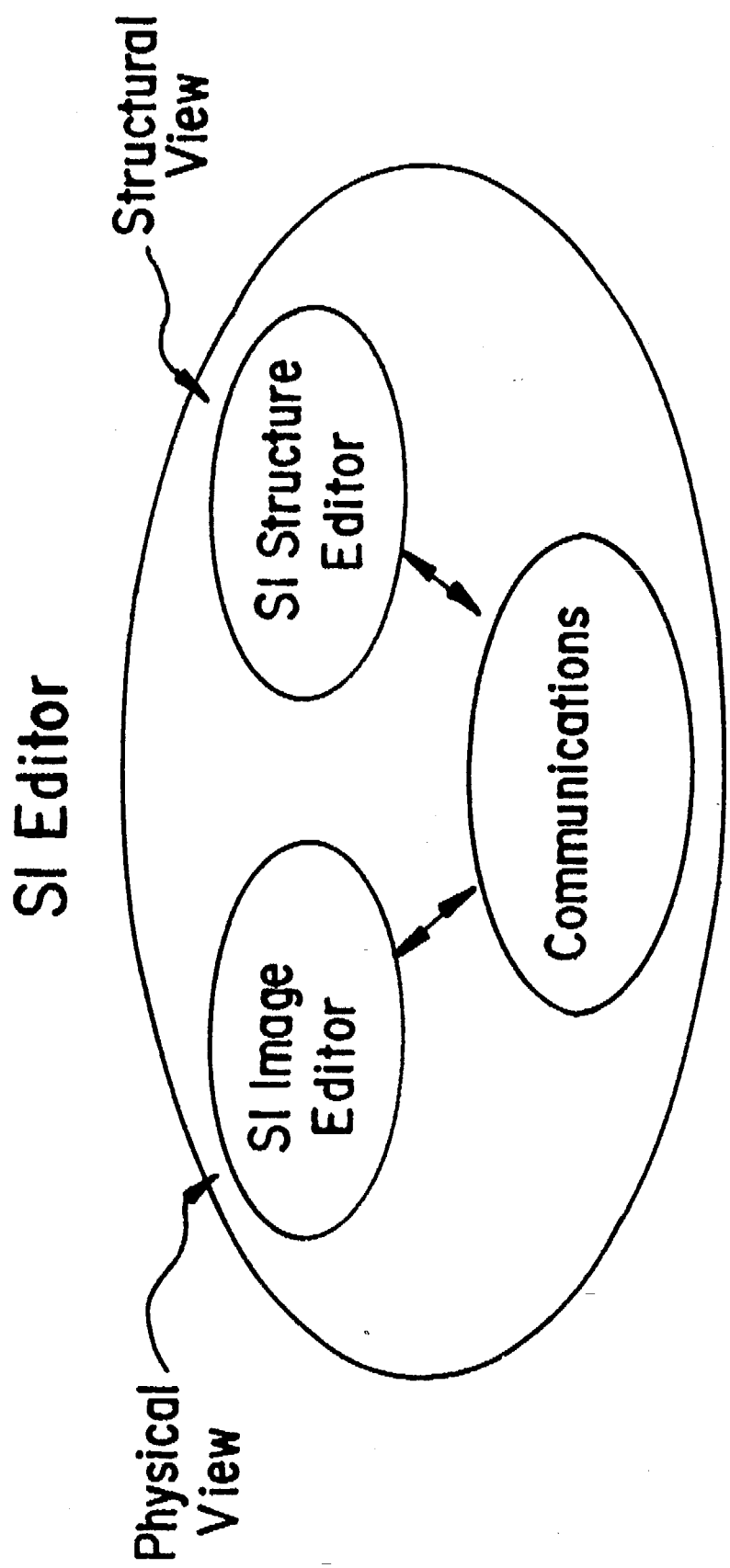
FIG. 9 is a graphic representation showing the communication path between the SI image editor and the SI structure editor.

There are two parts to an SI editor; 1) the Structure Editor; and 2) the Image Editor. The SI software architecture for both would provide for a communications ink to monitor the development of SIDs (see FIG. 9). The two parts of the SI editor can be described a physical (i.e., SI image editor) and structural (i.e., SI structure editor) view. The physical view is an actual rendering of the data while the structural view is a look at all of the operations required to create the physical view (i.e., it is a hierarchical representation of the SI). Thus, one immediate benefit from this model is that no operation is lost. That is, there is unlimited undo capability in the structural view. For example, if the user changes the background color in a first editing step and in several following editing steps changes other aspects of a raster, and then decides that the editing to the background in the first step is undesirable, the user can locate the processing step that colors the background and eliminate it while maintaining the changes made subsequent to the first editing step. In other words, the user can access any variation of an object image without undoing editing made subsequent to the aspect desired to be edited. Moreover, there are two logical separations to the structured image editor; physical view and structural view. The physical view shows the effects of operations performed on the image. This is similar to watching a painter paint a picture on a canvas. The structural view shows the hierarchy in which objects are created and the operations associated with those objects. Each of the image editor and the structure editor can be independently implemented. However, there is synergy when editing using both the image editor and the structure editor. It is not, however, the intention here to describe the structure editor, which will not be discussed further herein, but rather, to highlight the inventive benefits of an SI image editor. A model similar (though not in SI format) to the SI structure editor is the subject of another U.S. patent application Ser. No. 07/744,630, entitled "A Two View Graphics Editor And User Interface Methods For Constructing And Manipulating Complex Graphics Images", filed Aug. 13, 1991, owned by the assignee of the present invention, the disclosure of which is incorporated by reference herein.

Unlike other editors, the SI image editor handles multiple data types with an ability to retain their high level representation. To handle the data in the SI image editor, a unifying layer is employed to represent all data as SI objects. That representation is bits (i.e., raster). As discussed above, SI objects are a collection of bits grouped to support irregular shapes and are displayed and manipulated in real time. Importantly, there is an explicit object layering structure peculiar to SI, which places one object per level and greatly facilitates selections. No two objects can collide when moved within each other's proximity, because one object is either over or under the other. When a selection is made, the object seen by the user is the object selected. In addition, independent objects may be grouped independent of the object level. The objects can be grouped across layers in the editor by hierarchical grouping the selected objects as a list of objects under one SI object. Further, objects may also switch level positions, and finally, the ability to group many objects into one and split one object into many is also possible. Grouping many objects into one is done by creating a new SI outside of the editor and reading it back in as an individual object. This is different from the above grouping across layers. To split an object requires it to already exists as an SI (so that individual objects can be read) or the object undergoes segmentation to subdivide it into multiple objects. When objects are placed in what the user considers to be a final configuration, the objects can be physically grouped into one (this is different from a selection wherein multiple objects are grouped across levels). If an object is a SID, it may be split into its constituent parts.

Figure 1:
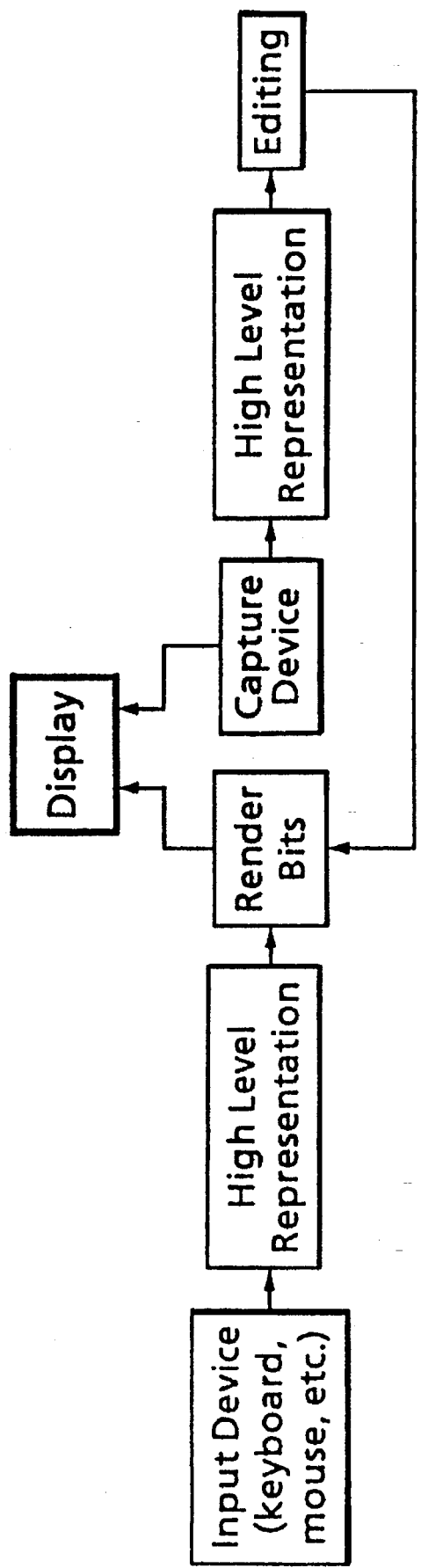
FIG. 1 is a generic information flow of a related art image editor.

A further system implementation difference between the SI image editor and the editor of FIG. 1, occurs after the "Render Bits" block. In the SI image editor, the bits are rendered from the high level representation that constitutes the SI object. Information associating the high level representation is reflected in the SI object that was created from the rendered bits. When edit requests are made for a selected SI object, an instance of the correct style editor, using identification or heritage tags, for that type object is created with the object loaded in as its higher level representation. When edits are complete, a rendering of the high level representation back to bits updates the SI object. Ideally, a user would edit full text pages as ascii documents, then render back to bits for the SI object. However, it is also possible to implement the editor using a single text line renderer to avoid manipulating multiple lines. The information flow for the SI image editor is shown in FIG. 10.

Figure 10:
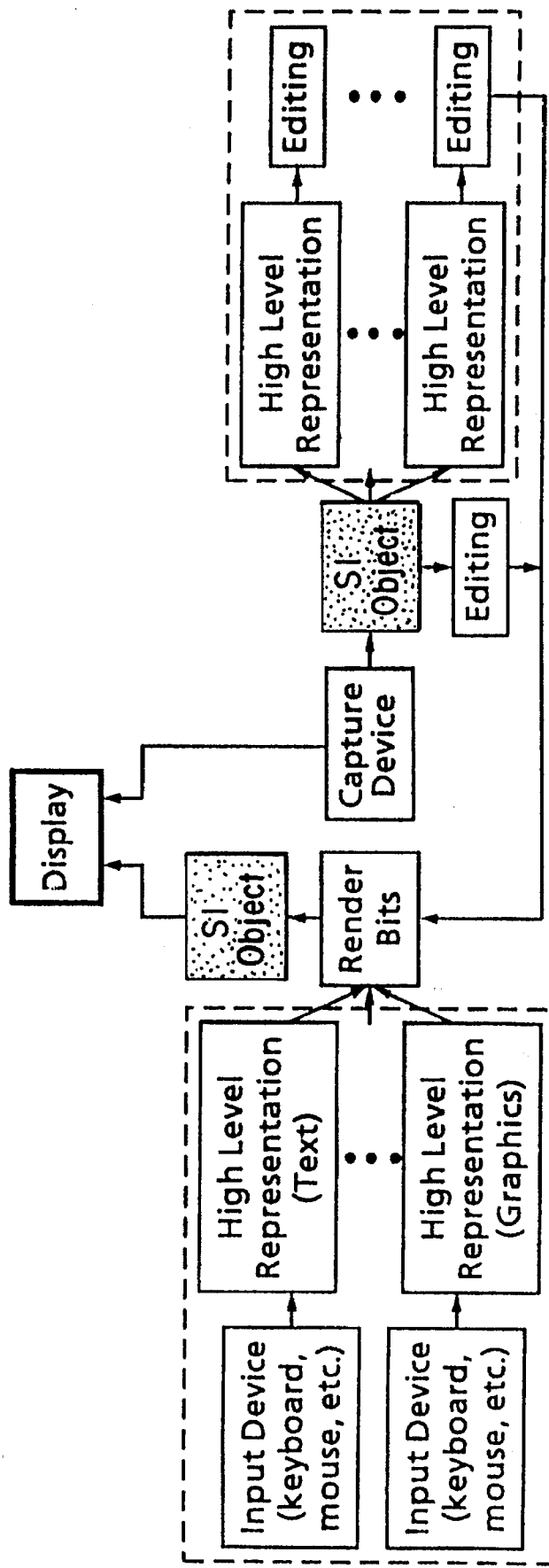
FIG. 10 is a block diagram depicting the SI display and re-edit functions.

In FIG. 10, an image is obtained from a disk or a scanner, or an image is created on the screen originally. The image, i.e., text, graphics or rasters, is then rendered as bits (Render Bits Box). Then, in the "SI object" box, the previously reduced bits are represented using a hierarchical representation, e.g., FIG. 5. The display is the device upon which the bits (raster data) are placed to show the physical view of the image. After the display step, the actual and/or structured image is sent to a capture device, which has the function to make an object selection. The object has the ability to be captured or selected using a capture device such as a mouse, arrow keys on the keyboard, etc. The capture device sends the image to the second "SI Object" box. From here, the image can be 1) edited as a raster image or 2) edited based on the object data type. The decision to edit in either mode 1) or 2) is determined by the user preference. For example, raster editing a textual data type is desirable when raster or bit editing operations are not supported in the text editors. For example, to edit the appearance of text such as "Xerox" to a specialized font, which is not available in the native text editor, would be accomplished by associating the text as a raster and editing based on the (textual) raster. This type of editing is not possible using prior art editors. Editing the object image using the high level representations is more desirable for changing the content of graphics and text because the style of operations for that editor have been optimized for efficiency. For example, changing the content of the text from "Xerox" to "Fuji Xerox"(in a font supported in the text editor) would not require the use of a raster representation of the text. After editing in mode 1) or mode 2), the edited image is again rendered to bits, after which the image may be edited again. It is not difficult to re-edit in an SI editor because there exists a history of all operations. Other editors do not have this ability.

As compared to FIG. 1, the editor of FIG. 10 has several advantages. Consider editing the image shown in FIG. 11. The key benefits are in the SI ability to capture a history of all processing operations. The added power for the editor of FIG. 10 is its ability to include the editing capability of higher level representation objects: text, vector graphics, CADCAM, etc. Furthermore, if it was desired to warp a textural sentence such as "An apple every day" in a manner corresponding to the shape of the apple shown in FIG. 11, the user could enter such text by adding the text object "An apple every day," placing it at a merge level after the apple, and adding a cylindrical warp IPO to its processing stream. If the same text were placed on the apple using the editor of FIG. 1, the user would be required to obtain a raster editor that had coded into it the ability to perform a render text and warp function. The point here is that the normal raster editor is no longer normal. It has been modified to add the performance of that specific operation. It is still a monolithic (single operation) application. In addition, the editor of FIG. 10 can go on to edit, individually, other objects, such as each car (which is raster as opposed to text), whereas the FIG. 1 editor cannot because its model of operation is limited to one raster object type. Moreover, the FIG. 10 editor's ability to associate the multiple data types as high level representations enables it to perform complicated editing of rasters, text, etc. By "associating" it is meant that the editor need only access the description (ASCII file) of the image without editing the bits, whereas the FIG. 1 editor must access bits to edit, especially after rendering edited images. In other words, the user would "click-on" the IPO desired to be edited in the structural views, whereupon the ASCII code describing the IPO would be displayed and edited.

In operation, a user would input through a user interface a portion of an image to be edited, using, for example, a mouse. Any image that can be "clicked-on" can be edited. For example, if the dragon and the couple in FIG. 11 were to be switched with the FIG. 11 editor, the dragon would be selected via a "click-on" by the mouse, for example, and dragged to the apple while the couple are selected and dragged to the original position of the dragon. This would result in the merge locations for the dragon and couple being switched in the structure editor. The FIG. 1 editor requires a large portion of, or the entire image to be reconstructed to switch the image objects.

Figure 11:
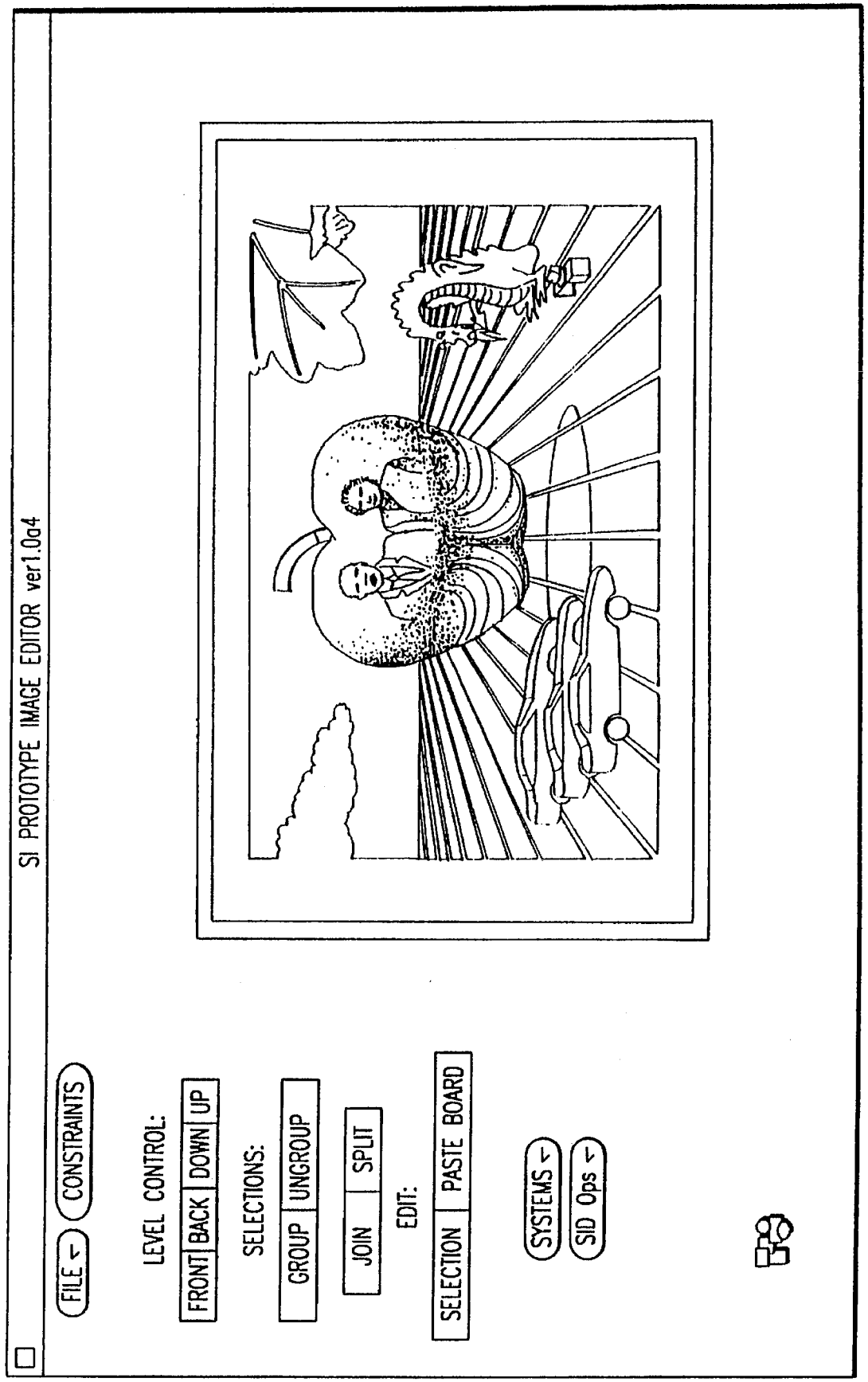
FIG. 11 is an example of a display screen depicting a current view of the SI image editor functions alongside an image to be edited.
Figure 12:
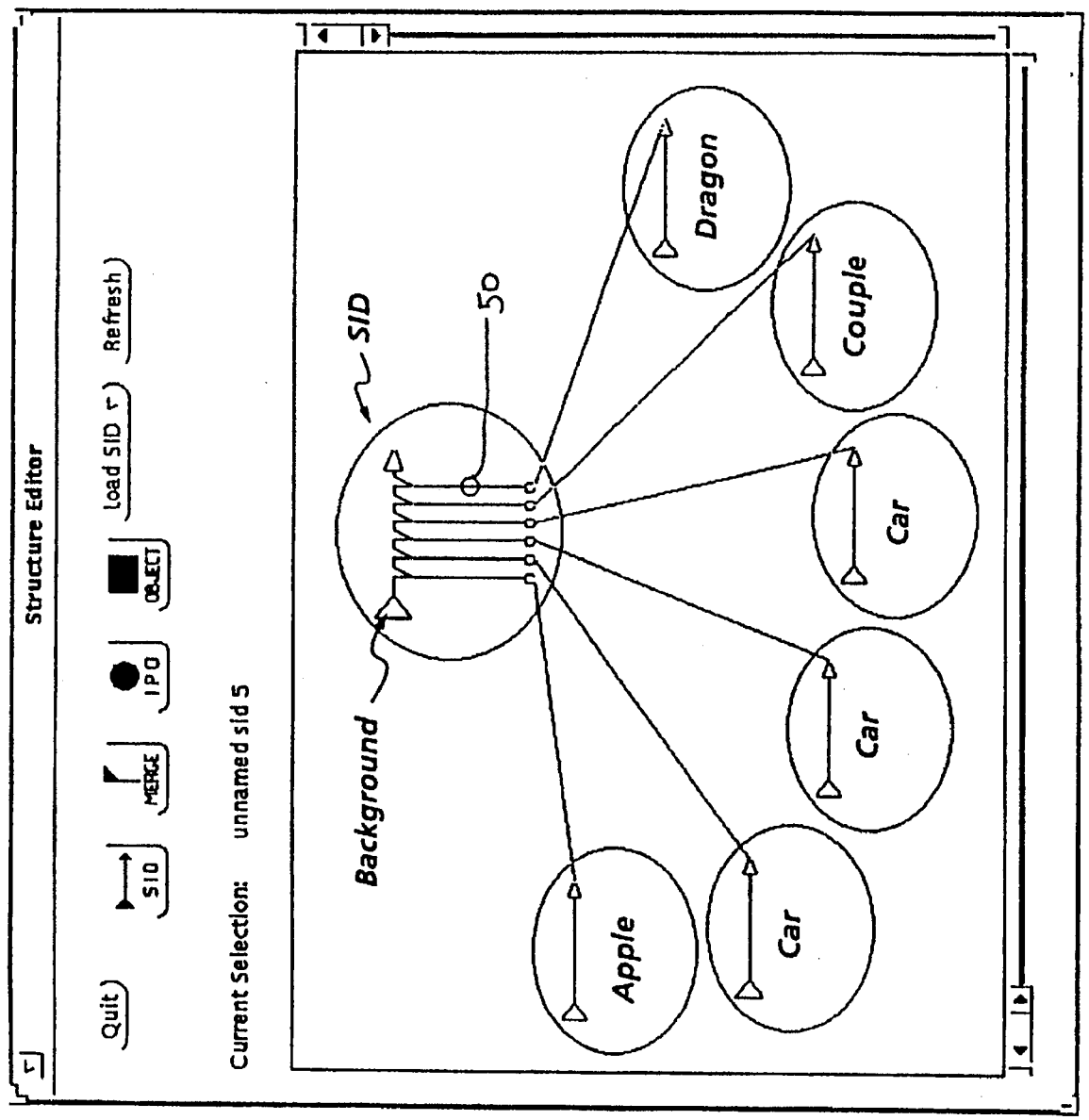
FIG. 12 is an example of a display screen showing the associated SID file for the SI shown in FIG. 11 graphically displayed in accordance with the invention.

FIGS. 11 and 12 provide samples of the SI image editor and of the SI structure editor respectively. The image shown in FIG. 11 is composed of the following objects: 1) a background with a black border; 2) the large image with the apple; 3) each car; 4) the dragon; and 5) the elderly couple in the apple. The SID file describing the image shown in FIG. 11 is 2.6 kbytes (1 kbytes compressed).

The SIP structure of the image shown in FIG. 11, is shown in FIG. 12. The same file is used whether the image is required for viewing or printing with no loss in end resolution. The SI renderer, which may be any suitable rendering program, requires a size field to determine how large to make the image. The renderer accepts a size field as an argument to call it. if no size argument is given, it will default to a display oriented size, e.g., try to fit in a box 512×512 while retaining the aspect ratio. This notation of resolution independence allows the SI image editor to perform at a much faster pace than other editors because it operates on screen resolution data.

Thus, the SI image editor provides significant benefits for real world SI applications. Available commercial packages require huge amounts of memory for interactive raster editing. One problem with medium to low level digital or raster editors is their usage of memory. Because the image is composed of bits, editing operations made to the image change bits. A common method for providing undo operations is to buffer enough memory to hold two versions of the original image. The initial image is placed in a first buffer. The first edit is merged with the first buffer and placed in a second buffer. This process continues toggling between buffers. If the operation is undo, the user renders the previous buffer. This requires large memory requirements. An original 24 bit, full page 300 spot per inch image consumes 28 megabytes. In order to edit this image, a minimum of 56 megabytes of spare disk memory is required. In addition, processing is very slow because each applied edit writes the full resolution image to a disk memory or swap. SI image editing, however, operates on display resolution imagery with display size memory requirements.

Additionally, storage of modified versions of an image/page typically requires memory at least equal to the original image/page. However, multiple versions of images/pages stored using SI require only small amounts of memory. In particular, the SI image description is an ASCII file, a fraction of the original size.

Further, most available bit editors allow only one level of undo, whereas the SI image editor allows unlimited undo as long as each undo is undone sequentially. Moreover, in the SI structure editor, undos can selectively be undone.

Finally, presently available editor environments are closed to all but a single instance of the edit session. With the SI image editor communications link (see FIG. 9), an operator can be editing an image on one machine with multiple other machines monitoring the edits on their machines, which are connected by network, for example, an X-windows network, which is commercially available. The other successions can monitor either view. In addition, a monitor can request edit control and proceed as the editor in charge. See examples of SI Image Editor that follow. This is not available on prior art machines because it is impractical to try an communicate image data over the network in the mode of operation. The bandwidth of network transmission would be swamped by sending raw image data. Prior art editors would have to do this to communicate changes. Every change would require an entirely new image to be sent. With SI technology, only a couple of ASCII lines are required to communicate all changes. Then the editor on the receiving end applies the change with the machine resources available to it.

B1. An Example of SI Image Editing

Importantly, SI is much more than a mere interactive editor. For instance, a high school yearbook printer has many individual pictures to prepare electronically for printing as a finished yearbook. In particular, photos must be scanned into the database, either individually (which is extremely time consuming) or technology exists where up to twelve photos may be scanned in at a time. Unfortunately, however, no matter how hard the user attempts to properly line up the individual pictures for scanning, there will always be slight deviations as a result of scanning. Usually each picture has a bar code or some other identifying features to tie the picture to the name that will be printed under it.

Software exists that is capable of generating an SI automatically in the scanning situation described above. That is, an SI is created that identifies each individual child object (i.e., the individual pictures) and includes image processing operations to correct any misalignment, and properly configure each picture on the page with the appropriate text underneath (bar code reference). Such software is capable of scanning many objects at a time and each child object will be derotated/rotated for proper rendering at printing. Therefore, the yearbook printer can, at his option, pick only the child objects desired for placement on that particular page, line them up as desired, add appropriate text, and print. As discussed above, the child objects are referenced by bar code for call-up.

Additionally, the yearbook printer may wish to create another SI by creating a template with "unbound" holes for the pictures and text as desired. A yearbook printer then binds (i.e., associates) the appropriate number of child objects to the template for printing, The SI is created with a variable entry where the picture would be. The SI renderer will also accept arguments of assignments for variable names. For example, the first picture is "$pict1". If a variable assignment was not given to the SI renderer, (i.e., if a specific picture was not assigned to a variable, such as $pict1), it would warn you that there is no object for "$pict1". This is called late or runtime binding of variables. This would allow the same SI to be used for many yearbooks where the format was the same but the content was totally different. Importantly, however, the template can also have intelligent processing built in (i.e., background, etc.) that will automatically change color, cropping, special effects, and so forth. Much like the use of variable names for objects, intelligent processing is associated with the SI IPOs. For example, if in a certain area you wanted black and white images for effect but the objects given to the SI were color, an IPO can have a conditional attached to it saying, for example, "If the photometry of this object is color then process IPO colorspace change to gray."

B2. A Second Example of SI Image Editing

A typical SI editing session will now be described. FIG. 11 shows an image with various identifiable items; an apple, people, cars, a dragon, etc. In this particular scene the people, cars, and the dragon are individual objects. This means that each object can be operated on independently of other objects. In addition, the objects could include text labels and line based graphics.

To create the scene in FIG. 11, the background image is loaded first. The independent objects are placed on the background. Each object is acquired through an image-type identifying procedure. All storage formats usually have some sort of identifying tag that defines their type. The initializer has a list of all supported formats and identifies the storage formats by tag type. There are special readers available for each type of raster, text, and graphic. For this composition all the objects are rasters. If text or graphics are desired, those types would be tagged accordingly, and the identification tag would be kept with the rendered object. The tag is kept in the data structure inside the editor. At the time the object is captured, an identification is made and the tag type set.

As objects are acquired for the SI editor, internal intelligence allows for resolution selections in the case of rasters and size specification in all other types. Moreover, the present editor uses a model of an image that is not simply a file. At a minimum, an image is represented or thought of as a collection of various formats and resolutions. The image editor or the SI renderer knows what size it needs, so the editor selects the appropriate file to edit to optimize performance. An example of the wrong way would be to use a print resolution file (2000×3000 dpi) to make an icon size (128× 128 dpi) image, which would take a lot of processing power to scale down. Thus, based on the image to be produced (icon, printer, display screen) the image editor selects the appropriate file. For example, if one wanted a text line, a request to the text renderer would specify the normalized dimensionality for the display. All acquisition and edit operations are done in display resolution. In contrast to the example described earlier, where a full page raster image consumes 28 Megabytes of space, a monitor display presents the same image at approximately 80% of full size and at one quarter the resolution. This translates, with a 72 dot per inch screen, to approximately 5.4 megabytes.

The object selection works with the model "if you can see it you can select it." In the case of the overlapping cars, the bottom car can be selected and operated on independently. For all objects, the base SI editor provides for fundamental operations such as: movement, groupings (collections of objects to act as one), hierarchical arrangements (relative position top to bottom), background borders, etc. Beyond that, editing of all objects have access to raster operations because all objects are ultimately represented as rasters. If editing of the acquired object is necessary, the SI editor can invoke, i.e., start up an independent process of the program that would work on that object, the native object editor due to its heritage tag (i.e., the tag associated with a particular object, which indicates the type (text, raster, vector, etc.) of the original object). In that environment, text and graphics can be edited in their natural high level representation. After high level edits are completed, the SI editor can reacquire the object and continue.

For every object acquisition and edit operation, a description is stored in the SI. Intelligent management of operations is also enabled in the SI editor. For example, when an object is acquired it can be scaled an infinite number of times without having this operation entered in the SI. Relative size is a value field in the acquisition process so changing the size field means you can change the way you acquire the image and really do not have to add the operation. In reference to the structure editor of FIG. 12, all objects except one appear to have been acquired only. In reality, many of them were scaled. The dragon, after scaling, had an additional operation performed. This operation shows up as a small circle 50 in the line connecting the object to the merge order. The operation performed here is a flipping of the image about the y-axis. In the structure editor of FIG. 12, the items of this interface can be selected and operated upon. Items can be added, deleted, or changed. If multiple operations were performed on the dragon object they would show up as small circles representing image processing operations. Unlike conventional editors, the SI structure editor can view the operations performed. The structure view and edit capability allows access to operations that were performed many steps earlier (thus, unlimited undo). For example, if five operations ago a flip operation was performed, one could modify or delete that operation through the structure editor. The structure editor allows one to compose a complete image without ever seeing it, although it is probably more desireable to view the image rather than the pasteboard representation while creating images. Connecting the structure editor to the image editor makes for a synergistic image editing environment.

C. Attached is an Appendix that lists the procedures for each of the structural and physical sides of the structured image editor. The procedures can be thought of as functions that enable the structure editor and the image editor to be created, and the operations that go to make up each of the types of editors. The list of procedures outlines various types of image processing operations and the basic user interface that is required for accessing the communications link for the image editor and the structure editor. Although the list of operations shown has been written in C language, the list of the operations and the actual source code of the structure and image editors can be written in other languages, such as Pascal, C++ or any suitable language that can enable the user interface to edit an object image.

D. Conclusion

The invention has been described with reference to preferred embodiments thereof, which are intended to be illustrative and not limiting. Various modifications may be made without departing from the spirit and scope of the invention as defined in the appended claims.

-19-

APPENDIX
Copyright, Xerox Corporation, 1994

```
/*
**
** Filename: "bld_se.c"
**
*/
main(argc,argv,envp)
bldr_init()
set_bld_callbacks()
```

- 20 -

```
/*
**
** Filename: "canvas.c"
**
*/
do_canvas(int key, CALLBACK_DATA *callback, CLIENT_DATA *client)
 doProcessKeys(int key,CALLBACK_DATA *callback,CLIENT_DATA
*client)/*ARGSUSED*/
 check_position(int x, int y)
 update_win_message(char *mesg, char *name)

do_canvas_repaint(int key, CALLBACK_DATA *callback, CLIENT_DATA
*client) /*ARGSUSED*/
 doXSystemInit()

do_copy(int mode, ...)
 do_copy_failed(int *o_current, int *o_state, int *c_mode)
do_refresh()
```

- 21 -

```
/*
**
** Filename: "ipo.c"
**
*/
do_ipo(int key, CALLBACK_DATA *callback, CLIENT_DATA
*client)/*ARGSUSED*/
ipo_func(int mode, ...)
point_inside_ipo(int obj, int ix, int iy)/*ARGSUSED*/
render_ipo(SE_IPO_OBJECT *ptr, int dolinks)
 render_ipo_links(void *vptr, int mode)
```

- 22 -

```
/*
**
** Filename: "libse.c"
**
*/
se_add(int method, int src, int dest, int control)
se_move(int src)
se_generate_id()
se_create(int type)
se_delete(int id)
se_remove(int id)
se_copy(int id)
se_copy_merge(SE_MERGE_OBJECT *old)
se_copy_ipo(SE_IPO_OBJECT *old)
se_copy_object(SE_OBJECT_OBJECT *old)
se_copy_sid(SE_SID_OBJECT *old)
se_find(int attr, ...)
  se_find_identifier_id(int id, int sub_attr)
se_find_sub_attr (void *v, int sub_attr)
  se_find_identifier_name(char *n)

se_dump(int mode, int id)
reset_out_links()
se_free(void *obj)
se_new_sid()
se_new_merge()
se_new_ipo()
se_new_object()
se_insert(void *src, void *dest, void *control)
se_append(void *src, void *dest, void *control)
se_error(char *s)
se_find_type(void *obj)
se_select_object(int cmd, ...)
se_set(int attr, ...)
```

- 23 -

```
/*
**
** Filename: "links.c"
**
*/
do_links(int key, CALLBACK_DATA *callback, CLIENT_DATA
*client)/*ARGSUSED*/
links_func(int mode, ...)
point_inside(int obj, int ix, int iy)
get_link_type(int obj)
```

```
/*
**
** Filename: "merge.c"
**
*/
do_merge(int key, CALLBACK_DATA *callback, CLIENT_DATA
*client)/*ARGSUSED*/
merge_func(int mode, ...)
render_merge(SE_MERGE_OBJECT *ptr, int redraw)
point_inside_merge(int obj, int ix, int iy)/*ARGSUSED*/
merge_props(SE_MERGE_OBJECT *m, ...)
merge_write_props (SE_MERGE_OBJECT *m)

** UI support for access to properties
doMergeApply(int key, CALLBACK_DATA *callback, CLIENT_DATA *client)
doMergeCancel(int key, CALLBACK_DATA *callback, CLIENT_DATA *client)
```

```
/*
**
** Filename: "message.c"
**
*/
init_messages()
handler(char *msg, char *name, char *d1, char *d2, char *d3)
tag_dump(id)
tag_attach(int type, ...)
 tag_attach_sid(va_list arglist)
 tag_attach_merge(int *icount, va_list arglist)
 tag_attach_object(int *icount, va_list arglist)
 tag_attach_ipo(va_list arglist)

tag_change(int mode, ...)
tag_get_it(id, want)
tag_read(int mode, ...)
tag_write(int mode, ...)
```

- 26 -

```
/*
**
** Filename: "object.c"
**
*/
do_object(int key, CALLBACK_DATA *callback, CLIENT_DATA
*client)/*ARGSUSED*/
render_object(SE_OBJECT_OBJECT *ptr, int mode)
point_inside_object(int obj, int ix, int iy)
object_func(int mode, ...)
object_props(SE_OBJECT_OBJECT *o, ...)
 object_write_props(SE_OBJECT_OBJECT *o)

** UI support for access to properties
doObjectApply(int key, CALLBACK_DATA *callback, CLIENT_DATA *client)
doObjectCancel(int key, CALLBACK_DATA *callback, CLIENT_DATA *client)
```

```
/*
**
** Filename: "se.c"
**
*/
user_init0(int *argc, char ***argv, char **env)/*ARGSUSED*/
 sew_init ()
user_init1(int argc, char **argv, char **env)/*ARGSUSED*/
user_init2(int argc, char argv, char env)/*ARGSUSED*/ do_Browser118(int key, CALLBACK_DATA *callback, CLIENT_DATA
*client)/*ARGSUSED*/
do_file_done1(int key, CALLBACK_DATA *callback, CLIENT_DATA *client)
do_file_save(char *file)
do_organize (int key, CALLBACK_DATA *callback, CLIENT_DATA *client)
 make_pretty(SE_SID_OBJECT *s, int sx, int sy)

doSIDMenu1(int key, CALLBACK_DATA *callback, CLIENT_DATA *client)
 doObjectState(int key, CALLBACK_DATA *callback, CLIENT_DATA *client)

find_closest(void *ptr, int type, int old_x, int old_y, int w, int h,
 idist(int x1, int y1, int x2, int y2)
 idist2(int p1x, int p1y, int p2x, int p2y, int old_x, int old_y)

set_cursor(Display *dpy, Window win, Cursor cursor)
create_cursor(char *bits, int w, int h, int hot_x, int hot_y)
do_find_match(Display *dpy, XEvent *event, int *args)/*ARGSUSED*/
get_last_event(Display *dpy, int type, Window window, XEvent
*last_event, int count)

full_ui_init()
```

- 28 -

```
/*
**
** Filename: "se_comm.c"
**
*/

Communications_init(char *arg1)
doConnections(int key,CALLBACK_DATA *callback,CLIENT_DATA *client)
  doConnection()

** External support functions
connect_cb(CallbackRequestTypes req, int conID, char *host, int appNum)
connect_ack_cb(CallbackRequestTypes req, int conID,char *machine,int progID)
connect_list(int key, CALLBACK_DATA *callback, CLIENT_DATA *data)
receive_cb(CallbackRequestTypes req, Datatype *data)
  receive_cb_ReceiveSID (char *data)

receive_ack_cb(CallbackRequestTypes req, Datatype *data)

se_comm_send(char *mesg, int dupit)
```

- 29 -

```
/*
**
** Filename: "se_io.c"
**
*/
** Handles Input Output information, e.g., file browser, save, etc. and
** environment controls like refresh and quit.
do_file(key,callback,client)

do_file_browser(key,callback,client)

do_browser_goto(key,callback,client)
  do_parse_path_name (char *input)
validate_ptr (char *ptr)

do_directory_store(key,callback,client)
do_file_store(key,callback,client)
do_file_store_button(key,callback,client)
  ** Get the filename to do the store. Filename is derived from a directory
  ** path and a name.
  get_filename_for_store (int last_used)

** Initialize the directory line in the Save window to be the
** current directory or the SI_DATA directory.
init_directory_store()
do_browser_window(key,callback,client)

mesg (int key, ...)
mesg_err (char *fmt_string, ...)
```

- 30 -

```
/*
**
** Filename: "se_props.c"
**
*/

** The following are callback functions for the dynamically created
** ipo attributes window.
do_apply(int key, CALLBACK_DATA *callback, CLIENT_DATA *client)
  compare_args(SE_IPO_OBJECT *s)
do_cancel(int key, CALLBACK_DATA *callback, CLIENT_DATA *client)
do_help(int key, CALLBACK_DATA *callback, CLIENT_DATA *client)
do_set(int key, CALLBACK_DATA *callback, CLIENT_DATA *client)
do_type(int key, CALLBACK_DATA *callback, CLIENT_DATA *client)
  delete_ipo_func (SE_IPO_OBJECT *s)

** Support functions
attribute_allocate(int type, ...)
  ipoargs2ipowin(char *name, char *val, SE_IPO_OBJECT *obj)
    xtString2ipowin (char *val, IPOArgs *b1, SE_IPO_OBJECT *obj)
    xtArray2ipowin (char *val, IPOArgs *b1, SE_IPO_OBJECT *obj)
    xtFArray2ipowin (char *val, IPOArgs *b1, SE_IPO_OBJECT *obj)
    xtBoolean2ipowin (char *val, IPOArgs *b1, SE_IPO_OBJECT *obj)

copy_list(char *name, IPOArgs *args, SE_IPO_OBJECT *i)

** If the object has not had the attribute window built, build it. If it
** has then show the window and current state of values.
readAttributes(SE_IPO_OBJECT *obj)
  bld_init_ipo_props_win(SE_IPO_OBJECT *obj)
    ipo_setup(int key)
      compar(a,b)

** This function dynamically creates the UI arguments window for SIDL
types
bld_init_props_win(int type, char *v, void (*apply)(), void (*cancel)())
build_xtip_args (char *fname, int type, char *v)

** Read the properties from the args list defined through .xtip file.
read_properties(int type, char *v)
se_tags2props_win (int type, char *v, int id)
se_tags2props_value(int type, char *c, IPOArgs *a, register TagValueList *v)
  arg_count (IPOArgs *a)
```

- 31 -

```
/*
**
** Filename: "sid.c"
**
*/ delete_all()
do_sid(int key, CALLBACK_DATA *callback, CLIENT_DATA
*client)/*ARGSUSED*/
point_inside_sid(int obj, int ix, int iy)

render_all()
render_sid(SE_SID_OBJECT *ptr, int redraw_obj)
render_sid_links(void *vptr, int mode)

sid_func(int mode, ...)
sid_props(SE_SID_OBJECT *s, ...)
sid_write_props (SE_SID_OBJECT *s)

** UI support for access to properties
doPasteboardApply(int key, CALLBACK_DATA *callback, CLIENT_DATA
*client)
doPasteboardCancel(int key, CALLBACK_DATA *callback, CLIENT_DATA
*client)
```

- 32 -

```
/*
**
** Filename: "bld_ie.c"
**
*/
main(argc,argv,envp)
bldr_init()
set_bld_callbacks()
```

```
/*
**
** Filename: "ie.c"
**
*/
user_init0 (int *argc, char ***argv, char **env) /*ARGSUSED*/
user_init1 (int argc, char **argv, char **env) /*ARGSUSED*/
user_init2 (int argc, char argv, char env) /*ARGSUSED*/ do_file_browser (int key, CALLBACK_DATA *callback, CLIENT_DATA
*client)
  do_file_browser_object (int key, CALLBACK_DATA *callback,
CLIENT_DATA *client)

** Menu callback to load pasteboard image
do_pasteboard (int key, CALLBACK_DATA *callback, CLIENT_DATA *client)

** Load the pasteboard as the background.
  load_base_image (WIN_STATE *wss, char *entry)

** Canvas size adjustment. Sizes/determines if scrollbars needed.
  pasteboard_size_adjustment (WIN_STATE *wss, int w, int h)

** Load the object as either the image or the pasteboard template.
  pasteboard_object (int key, CALLBACK_DATA *callback, CLIENT_DATA
*client)

do_order (int key, CALLBACK_DATA *callback, CLIENT_DATA *client)
do_group (int key, CALLBACK_DATA *callback, CLIENT_DATA *client)
do_join (int key, CALLBACK_DATA *callback, CLIENT_DATA *client)

** Perform the SID operations of Render to display or printer.
do_si_print (int key, CALLBACK_DATA *callback, CLIENT_DATA *client)
  do_si_print_setup (char *type)

** Perform operation of write to debug window.
do_sid_ops (int key, CALLBACK_DATA *callback, CLIENT_DATA *client)
sid_op_read (char *path)
sid_op_render (char *path, int *read_file, int si_parts)
  sid_op_render_single (char *path, SID_OBJ *s)
  sid_op_render_parts (char *path) /*ARGSUSED*/
    sid_op_render_single_path (TagId id, xtFWin *fwin, int is_sid)
    sid_op_render_parts_for_text (SID_OBJ *s, int merge_id)
    sid_fit2win (xtFWin *fwin, double asp_in)
  sid_op_render_named_sid (char *path) /*ARGSUSED*/
  sid_op_render_ezscan (char *path, int type)
  sid_op_render_ins (Instance *ins, char *path, SID_OBJ *si)

** Options are currently shadow, reflection.
doObjectOptions (int key, CALLBACK_DATA *callback, CLIENT_DATA
*client)
doObjectOptions2 (int key, CALLBACK_DATA *callback, CLIENT_DATA
*client)
  doObjectOptions2_aie (SID_OBJ *s)
```

- 34 -

```
** Determine what to do with the incomming object relative to selections.
ie_selection (SID_OBJ *s, int append_sel, int do_single_key, int nobox)
copy_selections (WIN_STATE *wss)
 copy_obj (SID_OBJ *p)
delete_selections (SID_OBJ *sel)
 de_select (int key)

move_sel (SID_OBJ *s, int xa, int ya, int xr, int yr, int do_relative)
move_ctl_pin (SID_OBJ *s, int x, int y)

mesg (int key, ...)
mesg_err (char *fmt_string, ...)

do_template_list (int key, CALLBACK_DATA *callback, CLIENT_DATA
*client)
add_template_list (SID_OBJ *s)
delete_template_list (SID_OBJ *s)

do_constraints (int key, CALLBACK_DATA *callback, CLIENT_DATA *client)
do_constraint_win (int key, CALLBACK_DATA *callback, CLIENT_DATA
*client)
do_scale_constraint (int key, CALLBACK_DATA *callback, CLIENT_DATA
*client)
do_motion_constraint (int key, CALLBACK_DATA *callback, CLIENT_DATA
*client)
do_rotation_constraint (int key, CALLBACK_DATA *callback, CLIENT_DATA
*client)
do_flip_constraint (int key, CALLBACK_DATA *callback, CLIENT_DATA
*client)
do_angle_constraint (int key, CALLBACK_DATA *callback, CLIENT_DATA
*client)
do_grid_constraint (int key, CALLBACK_DATA *callback, CLIENT_DATA
*client)
do_gravity_constraint (int key, CALLBACK_DATA *callback, CLIENT_DATA
*client)
do_ctl_constraint (int key, CALLBACK_DATA *callback, CLIENT_DATA
*client)
do_transform_constraint (int key, CALLBACK_DATA *callback,
CLIENT_DATA *client)
do_save_raster_constraint(int key, CALLBACK_DATA *callback,
CLIENT_DATA *client)
do_pasteboard_size_constraint(int key, CALLBACK_DATA *callback,
CLIENT_DATA *client)
do_bound_object_constraint(int key, CALLBACK_DATA *callback,
CLIENT_DATA *client)

** If a single selection exists, this function will envoke the
** appropriate editor for the selected object.
doSelEdit (int key, CALLBACK_DATA *callback, CLIENT_DATA *client)
 doSelEditPrinterSelection()
 doSelEditSelection (int key, CALLBACK_DATA *callback, CLIENT_DATA
*client)
 SelectionEditRaster (int key, CALLBACK_DATA *callback, CLIENT_DATA
*client)
 SelectionEditText (int key, CALLBACK_DATA *callback, CLIENT_DATA
*client)
```

- 35 -

PasteBoardEdit (int key, CALLBACK_DATA *callback, CLIENT_DATA *client)

doRefresh (int key, CALLBACK_DATA *callback, CLIENT_DATA *client)
 do_refresh_objects(WIN_STATE *wss)
  do_refresh_single_object (SID_OBJ *r)
 do_refresh_pasteboard (WIN_STATE *wss)

doModify (int key, CALLBACK_DATA *callback, CLIENT_DATA *client)

- 36 -

```
/*
**
** Filename: "ie_attr.c"
**
*/
do_attributes(s)

attr_apply(key,callback,client)
attr_cancel(key,callback,client)
attr_crop(key,callback,client)
attr_edit(key,callback,client)
attr_movable(key,callback,client)
attr_reflection(key,callback,client)
  attr_reflection_raster(SID_OBJ *s)
attr_soft(key,callback,client)
attr_shadow(key,callback,client)
  attr_shadow_raster(SID_OBJ *s)
  attr_shadow_text(SID_OBJ *s)
attr_template(key,callback,client)
attr_visibility(key,callback,client)
attr_opacity(key,callback,client)

** Apply the variables that can be. Check to see if a change has been
** registered first. If so go for it.
do_attr_apply(key,callback,client)

** Apply the opacitiy change to the given object.
do_attr_apply_opacity(s)
   do_who_is_under_me (s, key_list, ctl_pts)
   init_opacity_pasteboard(s)

do_attr_crop_apply(s)
do_attr_crop_events (key,callback,client)
   processCropKeys (SID_OBJ *s, KeySym k)
   printCropCoor (SID_OBJ *s)
     maprectpts (xtWin *ref, xtWin *rect, KeySym key)

** Update or set object position and size attributes in the attribute
window.
set_position_attributes(s,trect)

** The following code is a set of self contained functions that Dynamically
** maintain a rectangle drawn in a window. The left mouse button starts
** and expands a rectangle, the middle mouse button adjusts the rect based
** on edge control points and the right mouse button moves the entire rect.
draw_rect (dpy, draw, gcxor, r)
closest (dpy, draw, w, h, x, y, r)
set_start_rect (dpy, cursor, ref, r, c)
test_and_set_rect (w, h, ref, r, x, y, del_x, del_y, button, c)
  set_new_rect (w, h, x, y, r, ref, axis)
```

- 37 -

```
/*
**
** Filename: "ie_comm.c"
**
*/

CommunicationsInit (char *arg1)
CommunicationsClose (WIN_STATE *wss)
doConnections(int key,CALLBACK_DATA *callback,CLIENT_DATA *client)

** External support functions
connect_cb(CallbackRequestTypes req, int conID, char *host, int appNum)
connect_ack_cb(CallbackRequestTypes req, int conID,char *machine,int progID)
connect_list(int key, CALLBACK_DATA *callback, CLIENT_DATA *data)
receive_cb(CallbackRequestTypes req, Datatype *data)
  receive_get_obj (char *data, char **c, char *daddy)
  receiveIPO (char *data)
  receiveDelete (char *data)
  receivePosition (char *data)
  receiveSize (char *data)
  receiveTagIdData(char *data)
  sendTagIdData(TagId id, char *parent_id, char *mesg)
receive_ack_cb(CallbackRequestTypes req, Datatype *data)
ie_comm_send(char *mesg, int dupit)
```

- 38 -

```
/*
**
** Filename: "ie_cursor.c"
**
*/
set_cursor(winkey, type_cursor, return_state, all_objects)
 cursor_init(dpy)
 set_cursors(the_cursor)
get_cursor_type(type)
```

- 39 -

```
/*
**
** Filename: "ie_editor.c"
**
*/
setup_editors(dpy)
set_editor(val, ed_what2do, id, canvas_key, delete_old)
  set_editor_cursor(int key, int val, char *ed_what2do)
apply_editor(val,s,id)
setup_text_editor(key)

assign_event_handler(editor_event_handler)
getEncodedImage(key, ret_ximage)
getBufferedImage(userImage, key)

do_editor_groups(key,callback,client)
do_color_editor_constraint(key,callback,client)
do_gray_editor_constraints(key,callback,client)
do_misc_editor_constraints(key,callback,client)
 build_ipo_func (char *fname, SID_OBJ *s)
 delete_ipo_func (char *fname, SID_OBJ *s)
 read_ipo_properties(SID_OBJ *s)
  set_edit_window (int x, int y, xtWin r)
map_color_editor_type()
map_gray_editor_type()
do_editor_constraint_win(key,callback,client)
```

- 40 -

```
/*
**
** Filename: "ie_events.c"
**
*/
** Central event router for Local, Editor and Selector events.
doEvents (int key, CALLBACK_DATA *callback, CLIENT_DATA *client)

** The local event router.  Either goes to the base canvas or floating
object
  ** event handler.
  doLocalEvents (int key, CALLBACK_DATA *callback, CLIENT_DATA *client)
   doDisplayEvents (int key, CALLBACK_DATA *callback, CLIENT_DATA
*client)
   doObjectEvents (int key, CALLBACK_DATA *callback, CLIENT_DATA
*client)
   doEditorEvents (int key, CALLBACK_DATA *callback, CLIENT_DATA
*client)

doSelectorEvents (int key, CALLBACK_DATA *callback, CLIENT_DATA
*client)
 process_keys(WIN_STATE *wss, KeySym k, int *ctl, CALLBACK_DATA *cb)

** Window repaint and event handlers
baseKeyRepaint (int key, CALLBACK_DATA *callback, CLIENT_DATA
*client)
  initializeDropObject(key, dnd)
  initializeDragObject(key, dnd)

do_browser_window (int key, CALLBACK_DATA *callback, CLIENT_DATA
*client)

do_file_browser_event_handler (panel, event, arg, type)
SelectionConvertProc (sel, type, data, length, format)
  fill_selection()

do_text_debug(key,callback,client)

do_window(key,callback,client)
  do_drop_object (WIN_STATE *wss, char *dnd_selection)
  read_selection(Event *event, Selection_requestor sel) /*ARGSUSED*/
get_list_rect (int key)
browser_position_check(Event *event, int x, int y, int threshold)
```

```
/*
**
** Filename: "ie_io.c"
**
*/
** Handles Input Output information, e.g., file browser, save, etc. and
** environment controls like refresh and quit.
do_file (int key, CALLBACK_DATA *callback, CLIENT_DATA *client)

do_browser_goto(key,callback,client)
  do_parse_path_name (char *input)
  validate_ptr (char *ptr)

do_browser_load_si (int key, CALLBACK_DATA *callback, CLIENT_DATA
*client)
do_browser_sid_named_part_list (int key, CALLBACK_DATA *callback, \
do_browser_sid_input_type(key,callback,client)
do_directory_store(key,callback,client)
do_file_store(key,callback,client)
do_file_store_button(key,callback,client)
  store_modified_image (char *file, FILE *fp)
  store_sid (char *file, FILE *fp)
  format_SID4output (int ipd_id)
  ** Get the filename to do the store. Filename is derived from a directory
  ** path and a name.
  get_filename_for_store (int last_used)

doModifySize (int key, CALLBACK_DATA *callback, CLIENT_DATA *client)

** Initialize the directory line in the Save window to be the
** current directory or the SI_DATA directory.
init_directory_store()

browser_sid_input_type(menu, item)
browser_sid_template (menu, item)
  browser_template()

init_si_input_format (WIN_STATE *wss) /*ARGSUSED*/
browser_sid_input_submenu(menu_item, op)
  build_template_submenu()
    compar(a,b)
  make_template_submenu (char **list, int i, Xv_opaque frame)
```

- 42 -

```
/*
**
** Filename: "ie_lists.c"
**
*/

** Return the window state data structure if it matches the key.
get_valid_ws(key)

** If not null, find the correct object. If no match, return null
get_valid_obj (key, type)

** If not null, find the correct object. If no match, return null
map_str2object(char *str, int type)

** Given the key to an object, map the object data structure to the type.
map_key2object(key, s, wss)

add_ws_obj (WIN_STATE *wss)

delete_ws_obj (WIN_STATE *wss)

add_si_obj (ws,type)
 obj_init (s,type)
delete_si_obj (ws, key)

bottom_render (ws, key, up_one)
top_render (ws, key, down_one)

insert_render (ws, refkey, key, infront)

add_render(ws, key)
del_render (ws, key)

add_sel (ws, key)
del_sel (ws, key)
```

- 43 -

```
/*
**
** Filename: "ie_msg.c"
**
*/
init_ie_messages()
ie_msg_handler(msg, name, d1, d2, d3)
ie_msg_apply (msg, name, d1, d2, d3)
ie_msg_listen (int type, int state)
do_sid_read(TagName name, TagType type, TagId id, TagValueList *list)
sid_read_call(type, name, id, list)
 add_ie_taglist(ie_taglist **list, TagType type, TagName name, TagId id,
TagValueList *tlist)
   push_sid_list(ie_taglist **root, ie_taglist **list)

Debug and test code below this line free_ie_taglist(ie_taglist *list)

print_ie_list(ie_taglist *list, char *str, int mode)
print_ie_namelist(ie_taglist *list, char **names, int maxlen)
print_and_name_list (ie_taglist *list, char **names, int maxlen)

print_ie_tags(int io, int tag_id)

** Return a string with the variable contents of the tag type.
** For example, if type is "size", the string returned is either
** null or something like this "size 0.511688 0.387692".
get_tag_type_vars (TagId id , char *type )
  ** Find the type tag in the tag structure under the given tag id.
  write_my_tag ( TagId id , char *type)
  write_my_tag_values ( char *mp, register TagValueList *v , char *t, int ist)

********************* Tag Accquisiton Support Routines
********************** ieGetTagValue (TagId id, char *type)
ieGetTagTypeID (TagId id, char *type)
```

- 44 -

```
/*
**
** Filename: "ie_pb.c"
**
*/
apply_pasteboard_chg(WIN_STATE *wss)
  border(WIN_STATE *wss, char *bv)

do_pasteboard_window(key,callback,client)/* handle pb window events*/
doPasteboardEditOptions(key,callback,client)
  do_pasteboard_edit_cancel(key,callback,client)
  do_pasteboard_edit_reset(key,callback,client)
  do_pasteboard_edit_apply(key,callback,client)
  do_pasteboard_edit_color(key,callback,client)

do_pasteboard_edit_color_ckbox(key,callback,client)
  do_pasteboard_edit_color_on(key,callback,client)
  do_pasteboard_edit_color_off(key,callback,client)

do_pasteboard_edit_bor_color_ckbox(key,callback,client)
do_pasteboard_edit_color_selection(key,callback,client)
do_pasteboard_edit_opacity(key,callback,client)/* set pb opacity attribute
*/
do_pasteboard_edit_border_color(key,callback,client)/* set pb border
color */
do_pasteboard_edit_border_thickness(key,callback,client)
do_pasteboard_edit_pattern(key,callback,client)/* pb window pattern */ get_pasteboard_attributes(WIN_STATE *wss)
get_pasteboard_colors()

** Writes the pasteboard attribute in the pasteboard edit window.
init_pasteboard_window(WIN_STATE *wss)

** Call provided to the message handler to set pasteboard colors.
pasteboard_colors_call(mode,color_str)
pasteboard_repaint(key,callback,client)
pasteboard_reset(wss, callback)

pasteboard_selPaintSelection(WIN_STATE *wss, char *bt)
pasteboard_selClearSelection(wss)

pasteboard_setup(WIN_STATE *wss)
register_pasteboard (WIN_STATE *wss)

** Local functions only below this line. **
fill_colors(WIN_STATE *wss, int *vals)
fill_pasteboard(wss, current_line)
```

```
/*
**
** Filename: "ie_prt.c"
**
*/
do_print (int key, CALLBACK_DATA *callback, CLIENT_DATA *client)
do_printer_copies(int key, CALLBACK_DATA *callback, CLIENT_DATA
*client)
do_printer_format(int key, CALLBACK_DATA *callback, CLIENT_DATA
*client)
do_printer_layout (int key, CALLBACK_DATA *callback, CLIENT_DATA
*client)
do_printer_list(int key, CALLBACK_DATA *callback, CLIENT_DATA *client)
do_printer_measure (int key, CALLBACK_DATA *callback, CLIENT_DATA
*client)
do_printer_size (int key, CALLBACK_DATA *callback, CLIENT_DATA
*client)
do_printer_use_dpy (int key, CALLBACK_DATA *callback, CLIENT_DATA
*client)
 get_current_printsize (WIN_STATE *wss)

***************************** SUPPORT FUNCTIONS
**********************
generate_accu_prt_cmd_str ()
generate_siren_cmd_str (char *file)
 get_key_string (int key)
 get_prt_profile (char *pname)
 set_base_dimensions (PRT_PROFILE *prt, int layout, double *w, double
*h, double mult)
make_printer_list (PRT_UI *p)
 add_to_prt_list (char *path, char *item)
  compar(a,b)
bld_create_prt_ui (int parent)
```

```
/*
**
** Filename: "ie_rcinit.c"
**
*/
check_environment (char *display)
do_rc_file(WIN_STATE *wss, int local_check, char *arg)
 do_rc_file_wss(FILE *fp, WIN_STATE *wss, char *arg)
  set_status (WIN_STATE *wss, long state, char *line)
  ** Map the key nane string to an interger value
  keymap (char *c)

init_environment(wss)
init_win_state (WIN_STATE **wss)
init_win_state_X (int key, WIN_STATE *wss)

** Parse line for the geometry string. If the subsequent use of
** XParseGeometry finds anything in this string other than what is
** suppose to be there it fails.
get_geometry_string(line)
gethost()
```

```
/*
**
** Filename: "ie_seledit.c"
**
*/
doSelEditApply (int key, CALLBACK_DATA *callback, CLIENT_DATA *client)
doSelEditBlur (int key, CALLBACK_DATA *callback, CLIENT_DATA *client)
doSelEditEditors (int key, CALLBACK_DATA *callback, CLIENT_DATA
*client)
doSelEditEvents (int key, CALLBACK_DATA *callback, CLIENT_DATA
*client)
doSelEditEffect (int key, CALLBACK_DATA *callback, CLIENT_DATA *client)
  SelectionDelete (int key, CALLBACK_DATA *callback, CLIENT_DATA
*client)
  ieSelectionClear (int key, CALLBACK_DATA *callback, CLIENT_DATA
*client)
  SelectionInvert (int key, CALLBACK_DATA *callback, CLIENT_DATA
*client)
doSelEditMisc (int key, CALLBACK_DATA *callback, CLIENT_DATA *client)
  doSelEditCutSelection (int key, CALLBACK_DATA *callback, CLIENT_DATA
*client)
  doSelEditZoom (int key, CALLBACK_DATA *callback, CLIENT_DATA
*client)
doSelEditQuit (int key, CALLBACK_DATA *callback, CLIENT_DATA *client)
doSelEditOptions (int key, CALLBACK_DATA *callback, CLIENT_DATA
*client)
  doSelEditCancel (int key, CALLBACK_DATA *callback, CLIENT_DATA
*client)
  doSelEditRefresh (int key, CALLBACK_DATA *callback, CLIENT_DATA
*client)
  doSelEditUndo (int key, CALLBACK_DATA *callback, CLIENT_DATA
*client)
doSelEditSelectorProps (int key, CALLBACK_DATA *callback, CLIENT_DATA
*client)
doSelEditSelectors (int key, CALLBACK_DATA *callback, CLIENT_DATA
*client)
doSelEditType (int key, CALLBACK_DATA *callback, CLIENT_DATA *client)

doSelEditRepaint (int key, CALLBACK_DATA *callback, CLIENT_DATA
*client)
doSelEditZoomOut (int key, CALLBACK_DATA *callback, CLIENT_DATA
*client)
doSelEditZoomIn (int key, CALLBACK_DATA *callback, CLIENT_DATA
*client)
  zoom_sel_edit_image(wss,w,h)

********** Support functions below ********** get_object_in_edit ()
process_edit_request (SID_OBJ *s, char *mesg)
  selection2string (SID_OBJ *s, char **sel)

register_sel_edit (int key, int type)
register_selector_effect (int key)
```

- 48 -

```
select_resize (WIN_STATE *wss, int w, int h)
setup_selectors (Display *dpy, int key)
 init_selectors (int key)

ClearSelection (int key)
PaintSelection (int key)
redit_active (int flag)
```

- 49 -

```
/*
**
** Filename: "ie_sup.c"
**
*/
box_obj (s, key)
  box_single_obj (SID_OBJ *s)
un_box_obj (s, key)
  un_box_single_obj(SID_OBJ *s)
check_ctl_constraint(s, trans)

check_double_click(cb, duration)
check_transform (key, x, y)
check_ws_edit()

convertImage(key, convert_to)
  photo2space(image,w,h,photo,space)
draw_base_select (wss,r,x,y,restart)

empty_list (int key)

find_selection_center(s,xx,yy)

get_cursor_pos(wss,rx,ry,x,y)
getImageName (name, w, h, largest)

init_ctl_pt (int key, xtWin *ctl_pt)
init_xtip_params (parts,p1, bytes, pixels, bits, bps, size)

load_colormap(int key)
load_si_object (char *name, SID_OBJ *s, Instance *ins_in)

make_blank_obj(key, rect, type)
make_ctl_pin (WIN_STATE *wss, int x, int y)
make_blank_ras(x,y)
make_sel_mask(s)
make_tempfile (char *str)
make_trans_select (WIN_STATE *wss, int key, int x, int y)
map_flip_select(skey,tkey)
map_hdr2image_obj(hdr, s, maskFlag)
map_hdr2mask_obj(hdr, s)
map_object_size (WIN_STATE *wss, double size)
map_select(key)
map_selector_type()
map_object_type(s)

maskconvert(inmask,inbits,outbits,w,h)
** Check each object in the selection list to see if it needs to reapply
** transparency. Apply if update transparency is true.
opacity_check(SID_OBJ *s)
  opacity_check_execute (SID_OBJ *s)
pimage_1to1(WIN_STATE *wss, SID_OBJ *s, int w, int h)

pimage_cleanup (SID_OBJ *s, HEADER **hdr, Instance **ins, uchar **data)
pmask_cleanup (SID_OBJ *s, HEADER **hdr, Instance **ins, uchar **data)
```

- 50 -

```
pimage_merge(s, im)
pimage_object2wss (WIN_STATE *wss, SID_OBJ *s, int w, int h)
pimage_process(s, ins, image, mask, maskflag)
pimage2sid (s,rebox)
  pimage_encoding (Instance *ins, int seps, int bits)

process_init_image (s, image, parts, bytes, bits, size, maskflag)
process_init_mask (SID_OBJ *s, int *parts, int *bytes, int *bits, int size)
process_init_flip(ins, flip)
process_init_readimage (char *name, SID_OBJ *s)
process_init_rotate (Instance *ins, char *angle)
process_init_scale (Instance *ins, int w, int h)
query_edit_mode (WIN_STATE *wss)

redraw_objs (WIN_STATE *wss)

select_all(WIN_STATE *wss, int nobox)
set_application_busy (int val)
set_colormap4windowkey (int key, Display *dpy, Colormap colormap)
set_ctl_pin (WIN_STATE *wss, int key, int x, int y)
set_obj_position (SID_OBJ *s)
set_rect (char *entry, int wsize, int hsize, SID_OBJ *s, int force_fit)
set_unique_name (SID_OBJ *s)

si_object_add (WIN_STATE *wss, int type)
support_query (WIN_STATE *wss, char *str)

SICallError(char *mode, char *str)
  SIGetError()
  SISetError(char *fmt, ...)

toggle_win (int key)

update_brect_positions (SID_OBJ *s)

validate_selects (WIN_STATE *wss, bld_Rect *sr, int x, int y)

write_sid2file (WIN_STATE *wss)
```

-51-

```
/*
**
** Filename: "ie_tags.c"
**
*/

** Create merge and subordinant tags and add to ipd.
add_sid_tag (SID_OBJ *s, int merge_id, double normw, double normh)

** Create the tag structure for an SI image. Includes primary sid tag and
** name, pasteboard with color and opacity, and a representation with ipd
** reference name.
create_base_sid_tags(WIN_STATE *wss, char *sidname, char *color, char
*border,

** If a SID file was read in, delete it and free the tag lists.
delete_sid_read()

find_aspect_tag(double *aspect_ratio)

find_aspect_tag_old (double *aspect_ratio)
get_tag_format(TagId id)
make_aspect_tag(WIN_STATE *wss)

** Make a new merge and subordinant tags for the object based on type.
** Type may be Raster, Graphic, Text and Pattern.
make_sid_merge_tag(SID_OBJ *s)
 make_graphic_tags(SID_OBJ *s, char *fmt, char *name) /*ARGSUSED*/
 make_pattern_tags(SID_OBJ *s, char *fmt, char *name) /*ARGSUSED*/
 make_raster_tags(SID_OBJ *s, char *fmt, char *name) /*ARGSUSED*/
 make_text_tags(SID_OBJ *s, char *fmt, char *name)

** Delete the head ipo.
set_ipo_delete (SID_OBJ *s)

** Set an ipo given the object, function, message and selection.
** Parse the iefunctions file and find the named function. If
** suceccful add the ipo to the path.
set_ipo_tag(SID_OBJ *s, char *func, char *msg, char *sel)
 set_ipo_tagids(xtFunction *xtfunc, char *msg, char *sel)
  set_ipo_tagid_value(xtFunction *xtfunc, char *msg, TagId *list)
   iestring2TagId (xtArgument *arg, char *msg)
    xtString2TagId (xtArgument *arg, char **mem)
    xtArray2TagId  (xtArgument *arg, char **mem)
    xtFArray2TagId (xtArgument *arg, char **mem)
    xtBoolean2TagId (xtArgument *arg, char **mem)

** Change or set the crop ipo information of the object. If the object
** has no current ipo's attached change the relative size, position and
** add attribute selection to the representation.
set_ipo_crop_tag (SID_OBJ *s)

** Change or set the scale ipo information of the object. If the object
** has no current ipo's attached simply change the relative size in the
** base object.
set_ipo_scale_tag (SID_OBJ *s, double w, double h)
```

-52-

```
** The opacity of an object has changed so we need to create a pasteboard
** with opacity set or modify an existing pasteboard tag.
** the parent sid tag list.
set_object_pasteboard_tag(SID_OBJ *s)

** The pasteboard has been changed through the image editor so change it in
** the parent sid tag list.
set_pasteboard_tag(WIN_STATE *wss)

** This function is used to reset toytext objects.
set_text_tag(SID_OBJ *s)

** Change the merge tag position information of the object.
set_sid_position_tag(SID_OBJ *s)

** Change the size based on new pasteboard information.
set_size_tag (SID_OBJ *s)

** Tag manipulation support.
ieTagValueList(tag)
ieTagType(tag)

do_misc_ipo_setup()
  compar(a,b)
```

-53-

```
/*
**
** Filename: "ie_te.c"
**
*/
tedit_active(obj)
tedit_apply(id)
tedit_create(id)
tedit_delete(id)
tedit_end(id)
tedit_init(twin,tcanvas,x,y,client,trc,graycolors,colors)
tedit_obj_init(TEXT_OBJ *obj, xtWin *rect)
tedit_reedit(obj)
tedit_resize(obj,r,ang)
tedit_transform(s)

make_text_obj(edit)
data2sid(SID_OBJ *s, u_char *data, u_char *mask) /*ARGSUSED*/ do_angle(key,callback,client)
do_face(key,callback,client)
do_font(key,callback,client)
do_mask(key,callback,client)
do_size(key,callback,client)
do_text(key,callback,client)

init_tedit(t)
show_tedit_interface(edit)
tedit_interface_reset(t)
redisplay_text(t,do_xy)
data2ximage(t,data,w,h)
create_tedit_interface(t)
color_picker(t,x,y,dfh,dfs,dfv,br_id,hs_id,br,hue,sat)
set_callbacks(edit)
setup_main_image(edit)
setup_X(t)
hb_callback_routine(id,vid,value)
change_text_colors(t)
encodedCallback(key,callback,client)
BuildTheText(string,font,tw,th,bbox,bw,bh,wspace,w,h,ang)
name2path(name,face,path)
end_text(edit)
fileExists(path)
findFonts (int *nf)
text_edit_id_comp (obj, n)
TEXT_DEBUG_MSG(char *fmt_string, ...)
```

```
/*
**
** Filename: "ie_ui_init.c"
**
*/
** Install bitmaps into appropriate buttons. The init_buttons function
** should be inserted at the end of bld_init(). If UI builder is used
** it removes this call.
**
** This function basically fill in ui values not supported in bldr2 but
** added to the bldxv UI library.
full_ui_init (WIN_STATE *wss)
```

```
/*
**
** Filename: "ie_wss.c"
**
*/
** Test to see if we can launch new ie window.
launch_edit_window (SID_OBJ *s, int do_zoom)
launch_window_apply(key,callback,client)
launch_window_done(key,callback,client)

doZoomButton(key,callback,client)
doZoomEvents(key,callback,client)
  zoom_cancel(SID_OBJ *s, int x, int y)
doZoomExecute(WIN_STATE *wss)
  doZoomExecuteLevel2(WIN_STATE *wss, int w, int h)
doZoomReset(WIN_STATE *wss)
doUnZoomOne(WIN_STATE *wss)
setZoomFactor(WIN_STATE *wss)
  resetMargins(WIN_STATE *wss)

push_zoom(WIN_STATE *wss, ZWin *zw)
pop_zoom(WIN_STATE *wss)
```

- 56 -

```
/*
**
** Filename: "ie_xforms.c"
**
*/
flip_obj (s, tkey, x, y, restart)
    draw_flip_arrows(s, tkey, instate, rc_x, rc_y)
   do_obj_flip(s)
     obj_flip_ras(SID_OBJ *s, int twopass, char *sense1, char *sense2)
     obj_flip_text(SID_OBJ *s, int twopass, char *sense1, char *sense2)
     obj_flip_graphic(SID_OBJ *s, int twopass, char *sense1, char *sense2)
     obj_flip_pattern(SID_OBJ *s, int twopass, char *sense1, char *sense2)

rotate_obj (s, tkey, x, y, restart)
  do_obj_rotate(s)
    obj_rotate_ras(s)
    obj_rotate_text(s)
    obj_rotate_graphic(s)
    obj_rotate_pattern(s)

scale_obj (SID_OBJ *s, int tkey, int x, int y, int restart)
 do_obj_scale (s)
     do_obj_scale_check_size (SID_OBJ *s)
    obj_scale_ras(SID_OBJ *s)
     obj_scale_ras_with_ops (SID_OBJ *s)
    obj_scale_text(SID_OBJ *s)
    obj_scale_graphic(s)
    obj_scale_pattern(s)

shear_obj (SID_OBJ *s, int tkey, int x, int y, int restart)
  do_obj_shear (s)
    obj_shear_ras(s)
    obj_shear_text(s)
    obj_shear_graphic(s)
    obj_shear_pattern(s)

** Render a raster image object with ipo list.
obj_ras_render_path (SID_OBJ *s)
```

What is claimed is:

1. A structured image (SI) editor for editing a structured image that includes multiple data types, including individual objects, and a pasteboard that represents a frame onto which the multiple data types are rendered, said editor comprising:
   an SI structure editor operable to create a hierarchical representation of the structured image; and
   an SI image editor, coupleable to said SI structure editor, and being operable to edit said multiple data types while associating the multiple data types with their respective high level representations.

2. The editor of claim 1, wherein the SI structure editor and the SI image editor are combineable to form a communications link to perform at least one of monitoring and editing the development of a structured image definition.

3. The editor of claim 2, wherein the communications link allows editing of a structured image on a first machine while other machines, connected to the first machine, monitor the editing executed on the first machine.

4. The editor of claim 3, wherein each of said other machines is operable to edit each version of the edited structured image.

5. The editor of claim 1, wherein the SI structure editor and the image editor are one of independently operable and conjunctively operable.

6. The editor of claim 1, wherein said SI image editor comprises a layering means that places each of said objects on an object level, such that the objects are prevented from colliding on a rendered pasteboard, and object selection is facilitated.

7. The editor of claim 6, wherein the SI image editor layering means groups said objects together independent of said object level.

8. The editor of claim 6, wherein the SI image editor layering means switches said objects to different object level positions.

9. The editor of claim 6, wherein the SI image editor layering means groups a plurality of said objects into one object and across multiple object levels.

10. The editor of claim 6, wherein the SI image editor layering means splits each object into a plurality of objects, and each of said plurality of said objects are placed on separate object levels.

11. The editor of claim 1, wherein said structured image has a resolution that is dependent on a resolution of a connected output device.

12. The editor of claim 11, wherein said output device includes one of a monitor, a printer, a pen-plotter, and a display device.

13. The editor of claim 11, wherein the structured image resolution comprises display resolution imagery with display size memory requirements.

14. The editor of claim 1, wherein storage of an edited structured image requires less memory than that of an original raster image represented by the edited structured image.

15. The editor of claim 14, wherein multiple versions of edited structured images require a memory that is a fraction of a memory size required for said original raster image.

16. The editor of claim 15, wherein the multiple versions of said edited structured images are represented as descriptive text in an ASCII file.

17. The editor of claim 1, wherein said multiple data types include one of and any combination of text, graphics and rasters.

18. A method for editing a structured image (SI) that includes multiple data types, including individual objects, and a pasteboard that represents a frame onto which the multiple data types are rendered, the method comprising the steps of:
   defining and editing image processing operations required to create a hierarchical representation of the structured image; and
   editing said multiple data types using at least one of an SI image editor and an SI structure editor while associating the multiple data types with their respective high level representations.

19. The method of claim 18, further comprising providing a communications link for monitoring development of said structured image and said image processing operations.

20. The method of claim 19, further comprising editing a structured image on a first machine, and monitoring the editing on at least one other machine using said communications link.

21. The method of claim 20, further comprising editing the structured image using the at least one other machine.

22. The method of claim 18, further comprising providing a unifying layer for representing said multiple data types as one of bits and rasters.

23. The method of claim 18, further comprising placing each of said objects in a layering structure that includes a plurality of object levels, thus preventing the objects form colliding on a rendered pasteboard, and facilitating object selection.

24. The method of claim 23, further comprising grouping said objects together independent of said object level.

25. The method of claim 23, further comprising switching object level positions of said objects.

26. The method of claim 23, further comprising grouping a plurality of objects into one object and across multiple object levels.

27. The method of claim 23, further comprising splitting each object into a plurality of objects, and placing each of the plurality of objects on a separate object levels.

28. The method of claim 18, further comprising representing and saving multiple versions of edited structured images as a description in an ASCII file.

29. The method of claim 18, further comprising providing unlimited undo capability by providing each edited structured image with a memory that is less than a fraction of a memory size required for an original raster image represented by said edited structured image.

30. The method of claim 18, further comprising adopting a resolution value from a connected printing device as a resolution of said structured image.

31. The method of claim 18, wherein said editing further includes determining the type of image to be edited, and editing the object image based on said determining.

32. The method of claim 31, wherein said determining includes reading a heritage tag that identifies the type of structured image to be edited.

33. The method of claim 18, wherein said SI image editor operates to edit said multiple data types using high level representations, and said SI structure editor operates to edit and create image processing operation.

34. The method of claim 33, wherein said editing includes editing said multiple data types using both the SI image editor and the SI structure editor.

35. The method of claim 18, further comprising rendering said multiple data types into bits, and editing said rendered multiple data types.

36. The method of claim 18, further comprising displaying said multiple data types on first and second display areas, wherein the first display area displays said hierarchical representation including at least one of any combination of said image processing operations, image merge orders, and imaging composition operations, and the second display area displays said structured image as a high level representation.

37. The method of claim 36, wherein said first display area is one side of a split screen monitor, and the second display area is a second side of said split screen monitor.

38. The method of claim 36, wherein said first display area is a first monitor, and the second display area is a second monitor.

39. The method according to claim 18, further comprising editing using said SI image editor while highlighting the SI object on said hierarchical representation.

* * * * *